United States Patent
Edstrom, Sr. et al.

(10) Patent No.: US 6,382,589 B1
(45) Date of Patent: May 7, 2002

(54) LATCH MECHANISM AND QUICK-CONNECT COUPLING USABLE WITH AUTOMATIC WATER DOCKING SYSTEM FOR CAGE AND RACK SYSTEMS

(75) Inventors: William E. Edstrom, Sr., Waterford; Peter S. Planton, Muskego, both of WI (US)

(73) Assignee: Edstrom Industries, Inc., Waterford, WI (US)

( * ) Notice: Subject to any disclaimer, the term of this patent is extended or adjusted under 35 U.S.C. 154(b) by 0 days.

(21) Appl. No.: 09/173,397

(22) Filed: Oct. 15, 1998

Related U.S. Application Data

(63) Continuation-in-part of application No. 08/601,528, filed on Feb. 14, 1996, now Pat. No. 5,823,144.

(51) Int. Cl.[7] .......................... F16L 29/02; F16L 37/40
(52) U.S. Cl. .................................................. 251/149.6
(58) Field of Search ...................................... 251/149.6

(56) References Cited

U.S. PATENT DOCUMENTS

| | | | |
|---|---|---|---|
| 3,227,158 A | 1/1966 | Mattingly | 128/66 |
| 3,540,437 A | 11/1970 | Troy | 128/66 |
| 3,567,175 A | 3/1971 | Sciuto, Jr. | 251/149.6 |
| 3,809,122 A | 5/1974 | Berg | 137/614.06 |
| 3,874,343 A | 4/1975 | Niki | 119/72.5 |
| 4,302,186 A | 11/1981 | Cammack et al. | 433/80 |
| 4,337,040 A | 6/1982 | Cammack et al. | 433/80 |
| 4,343,261 A | 8/1982 | Thomas | 119/15 |
| 4,402,280 A | 9/1983 | Thomas | 119/15 |
| 4,442,831 A | 4/1984 | Trenary | 128/66 |
| 4,452,238 A | 6/1984 | Kerr | 128/66 |
| 4,485,845 A | 12/1984 | Brady | 137/614.04 |
| 4,824,368 A | 4/1989 | Hickman | 433/80 |
| 4,863,202 A | 9/1989 | Oldford | 285/321 |
| 5,042,429 A | 8/1991 | Deitrich et al. | 119/15 |
| 5,044,316 A | 9/1991 | Thomas | 119/15 |
| 5,048,459 A | 9/1991 | Niki et al. | 119/17 |
| 5,074,524 A | 12/1991 | Wade | 251/149.6 |
| 5,080,521 A | 1/1992 | Quaile | 403/326 |
| 5,148,766 A | 9/1992 | Coiro, Sr. et al. | 119/17 |
| 5,167,398 A | 12/1992 | Wade et al. | 251/149.6 |
| 5,253,842 A | 10/1993 | Huebscher et al. | 215/149.6 |
| 5,337,696 A | 8/1994 | Edstrom et al. | 119/18 |
| 5,385,118 A | 1/1995 | Coiro, Sr. et al. | 119/18 |
| 5,501,177 A | 3/1996 | Edstrom, Sr. et al. | 119/72.5 |
| 5,544,858 A | 8/1996 | Rogers et al. | 251/149.6 |
| 5,595,213 A | 1/1997 | Brown | 137/15.5 |
| 5,796,419 A * | 8/1998 | Clark et al. | 251/149.6 |

* cited by examiner

Primary Examiner—Kevin Shaver
Assistant Examiner—Eric Keasel
(74) Attorney, Agent, or Firm—Boyle Fredrickson Newholm Stein & Gratz S.C.

(57) ABSTRACT

A water docking system for an animal cage and rack system including a latch mechanism and a leakproof coupling. The latch mechanism includes a latch catch which is movable 1) from an unlatched position in which it is disengaged from the cage and permits removal of the cage from the rack 2) to a latched position holding the cage in its docked position. The latch also provides an indicator for indicating when the latch is in an unlatched position and the cage is not properly docked. The coupling may comprise either a friction-fit quick-connect coupling, an active locking quick-connect coupling, or a passive locking quick-connect coupling. A male fitting of the coupling is designed to prevent leakage by sequentially engaging two internal seals of the female fitting so as to first seal against the female fitting and then open an internal valve element of the female fitting. The sealing elements may be formed from distinct seals or spaced portions of a combined seal.

11 Claims, 15 Drawing Sheets

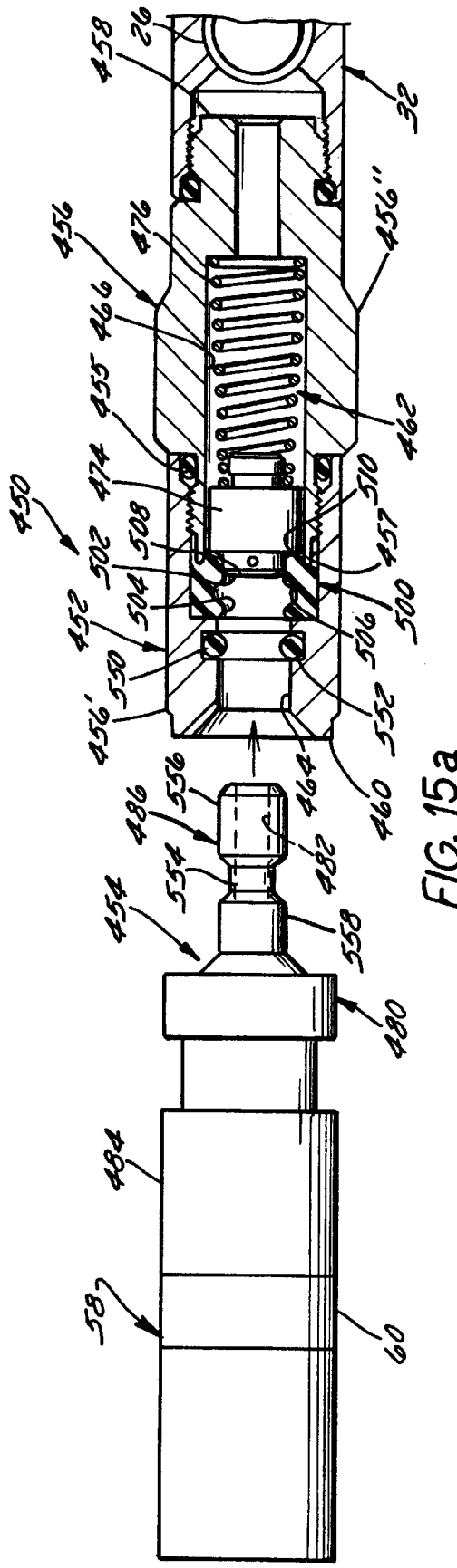

LATCH MECHANISM AND QUICK-CONNECT COUPLING USABLE WITH AUTOMATIC WATER DOCKING SYSTEM FOR CAGE AND RACK SYSTEMS

CROSS REFERENCE TO RELATED APPLICATION

This application is a continuation-in-part of U.S. patent application Ser. No. 08/601,528 filed Feb. 14, 1996, which is now U.S. Pat. No. 5,823,144.

BACKGROUND OF THE INVENTION

1. Field of the Invention

The invention relates to a latch mechanism and/or a quick-connect coupling usable with an automatic water docking system which facilitates docking and which inhibits or prevents rack flooding.

2. Discussion of the Related Art

It is desirable to supply drinking water to laboratory animals or the like reliably and automatically upon demand. Such water is typically supplied to animals housed in cages docked to a water manifold of a rack system.

One such cage and rack system is disclosed in U.S. Pat. No. 5,042,429 to Deitrich et al. (the Deitrich patent) The system disclosed in the Deitrich patent houses a plurality of laboratory animals in rows of cages supported on shelves of a rack. The cages are supplied with water by a common water manifold and with air by a common air manifold.

Watering systems of the type disclosed in the Deitrich patent must accommodate frequent removal of the individual cages from the rack, e.g., for testing animals housed therein or for cage cleaning. Such systems usually also seek to minimize cross-contamination of the animals housed in the various cages. Deitrich attempts to accommodate these requirements by connecting each of the individual cages of its system to the water manifold by a quick-connect coupling. This coupling includes, in the case of each cage, a watering valve fixed to the cage, a male fitting attached to the watering valve and extending inwardly from the cage, and a female fitting extending outwardly from the water manifold. The male fitting engages the female fitting with a friction fit when the cage is properly positioned on the rack. According to the Deitrich patent disclosure, the friction-fit type quick-connect coupling facilitates removal and replacement of the cages, and the internal watering valve prevents or at least inhibits cross-contamination between cages.

The friction-fit quick-connect coupling employed by the Deitrich patent, while facilitating removal and replacement of a cage, exhibits the disadvantage of not "locking" the cage in its docked position so that, if the cage is bumped or improperly positioned, the coupling may leak and/or fail to deliver water to the animal housed in the cage. While failing to deliver water to the animal is problematic because it could result in the dehydration or even death of the animal, leakage is an even greater problem because it could result in the flooding of several or even all of the cages on a rack and in the sickness or even death of all of the animals housed in those cages. The need therefore has arisen to provide a water docking system which, while facilitating removal and replacement of cages and preventing or at least inhibiting cross-contamination between cages, also reliably delivers drinking water without leakage to the animals housed in the cages.

One at least partially successful attempt to address this need is disclosed in U.S. Pat. No. 5,337,696 to Edstrom et al. (the Edstrom patent). The cage and rack system disclosed in the Edstrom patent inhibits unintended cage undocking by using a locking quick-connect coupling to connect the watering valve to the water manifold. The locking quick-connect coupling disclosed in the Edstrom patent has a collar on the female fitting which locks onto the male fitting when a plug of the male fitting is inserted into the female fitting and which must be manually retracted to permit subsequent uncoupling. Uncoupling is facilitated by a decoupler which may take the form of a lever mechanism or a cable mechanism leading from the front of the cage to the collar on the female fitting.

The docking system of the cage and rack system disclosed in the Edstrom patent inhibits leaks and assures the supply of water to animals once the male fitting of the quick-connect coupling is positively locked to the female fitting. However, certain characteristics of this system may be considered disadvantageous to some. For instance, it is difficult for the casual inspector to determine whether or not the male fitting is in fact locked to the female fitting unless he or she physically grabs the cage and pulls it towards him or her with some force. Moreover, both the locking quick-connect coupling and the associated decoupler are relatively expensive to manufacture. The decoupler also inhibits to some extent cage removal because a person who is removing the cage must first actuate a lever or cable mechanism to release the locking coupling, then remove the cage from the shelf.

In short, the system disclosed in the Edstrom patent represents a trade-off when compared to existing water docking systems employing friction-fit couplings. It provides a much more reliable and less leak-prone connection of the watering valve to the water manifold and effectively locks the cage in its docked position. However, these benefits come at the cost of increased complexity and reduced ability to remove the cage from the rack.

As discussed above, a problem associated with many prior art water docking systems, and particularly those using friction-fit couplings, is that the couplings used in such systems tend to leak unless the cage is maintained in a fully-docked position on the rack in which the plug of the male fitting is fully inserted into the bore of the female fitting. This leakage results from the fact that the plug of the typical male fitting seals against the female fitting only after it opens the internal valve of the female fitting. Accordingly, water may flow around the male fitting and leak out of the coupling for a brief time as the male fitting is being inserted into the female fitting. If the male fitting is left in this partially-inserted position, water flows past the male fitting and leaks out of the coupling on a continuous basis, flooding the cage and rack system.

Prior art attempts to solve the problem of coupling leaks focused on locking the coupling and/or cage in a position in which the male fitting was sealed against the female fitting. Leakage could still occur if these latches or other safety features were improperly used, failed, or were circumvented. Leakage could also occur if the internal seal of the coupling failed.

OBJECTS AND SUMMARY OF THE INVENTION

It is therefore a primary object of the invention is to provide a latch mechanism usable with or without a water docking system which interacts with a water coupling to prevent coupling leakage and consequent cage flooding and to help ensure the continuous supply of drinking water to animals housed in the cage.

In accordance with a first aspect of the invention, this object is achieved by providing a latch mechanism including an indicator assembly which provides an indication that the latch catch is disengaged from the front wall of the cage. The indicator assembly preferably comprises an indicator flag mounted on the pivot arm and a shield provided on the support plate, the shield preventing observation of the indicator flag when the pivot arm is in the first position and permitting observation of the indicator flag when the pivot arm is in the second position.

In accordance with another aspect of the invention, this object is achieved by providing a latch mechanism including a stationary support plate, a pivot arm, a latch catch, and a spring. The support plate is configured to extend at least generally in parallel with the sidewalls of the cage. The pivot arm has inner and outer ends and has front and rear faces. The inner end of the pivot arm is pivotally attached to the support plate so as to be swingable from a first position in which the pivot arm extends at least substantially in parallel with the support plate to a second position in which the pivot arm is not substantially parallel with the support plate. The latch catch extends inwardly from the front face of the outer end of the pivot arm, the latch catch engaging the front wall of the cage to hold the cage in the designated position when the pivot arm is in the first position and becoming spaced from the cage when the pivot arm is in the second position. The spring biases the pivot arm towards the first position.

A second primary object of the invention is to provide a water coupling which is usable with or without a water docking system.

Another object of the invention is to provide a water coupling which meets the second primary object of the invention and which incorporates a safety feature that prevents leakage by assuring that the male fitting of the coupling is sealed to the female fitting before the internal valve of the female fitting opens.

In accordance with yet another aspect of the invention, these objects are achieved by providing a quick-connect coupling which includes a female fitting and a male fitting. The female fitting includes a generally cylindrical body, first and second axially spaced seals, and a valve core. The body has inlet and outlet ends and has a bore formed therein which extends axially from the outlet end thereof towards the inlet end thereof. The seals are located in the bore, the second seal being located axially between the first seal and the outlet end of the body. The valve core is located in the bore between the first seal and the inlet end of the body and is capable of sealingly seating on the first seal. The male fitting includes a generally cylindrical plug. The plug 1) is dimensioned to fit in the bore in the female fitting of the coupling, 2) has an outer radial periphery, and 3) has a bore formed axially therethrough. The plug, the first and second seals, and the valve core are so dimensioned and configured that, when the plug is inserted axially into the bore in the female fitting from the outlet end thereof, 1) the outer radial periphery of the plug first slidably seals against the second seal, 2) the plug then lifts the valve core from the first seal, and 3) the outer radial periphery of the plug then slidably seals against the first seal.

Alternatively, the male fitting may be sealed to the female fitting by a combined seal that includes first and second portions separated from one another by a divider portion of reduced diameter when compared to the first portion and to the second portion. The second portion is located axially between the first portion and the outlet end of the body. The plug, the first and second portions of the seal, and the valve core are so dimensioned and configured that, when the plug is inserted axially into the bore in the female fitting from the outlet end thereof, 1) the outer radial periphery of the plug first slidably seals against the second portion of the seal, 2) the outer radial periphery of the plug then slidably seals against the first portion of the seal, and 3) the plug then lifts the valve core from the first portion of the seal.

The coupling may comprise a friction-fit quick-connect coupling in which the male fitting of the coupling engages the female fitting with a friction fit only.

Alternatively, the coupling may comprise an active locking quick-connect coupling in which female fitting includes 1) a collar slidably mounted on the body, and 2) a plurality of locking balls which are mounted in holes formed in the body. The locking balls engage recesses in the outer radial periphery of the plug of the male fitting of the coupling when the plug is inserted into the bore in the female fitting. The collar is movable from a first position in which it forces the locking balls into the recesses to prevent axial movement of the male fitting with respect to the female fitting to a second position in which it permits the locking balls to move out of the recesses to permit axial movement of the male fitting with respect to the female fitting.

Alternatively, the coupling may comprise a passive locking quick-connect coupling. In this case, an oversized locking O-ring on one of the female fitting and the male fitting engages a groove in the other of the female fitting and the male fitting upon full insertion of the male fitting into the female fitting, thereby providing a snap-fit effect. The resultant connection combines the benefits of 1) ease of connection of a friction fit coupling and 2) the security of a locking coupling.

Yet another primary object of the invention is to provide an improved method of docking a cage to and undocking the cage from the water manifold of a cage and rack system.

In accordance with yet another aspect of the invention, this object is achieved by providing a method which includes providing a cage and rack system having a docking system as described above, then positioning the cage in a docked position on the shelf in which the male fitting is inserted into the female fitting so as to be sealed against the female fitting and so as to permit water to flow through the female and male fittings from the manifold, and, during the positioning step, moving the latch catch of the latch mechanism from an unlatched position in which it is disengaged from the cage and permits removal of the cage from the shelf to a latched position in which it positively engages the front wall of the cage and holds the cage in the docked position.

The use of the inventive docking system permits a single hand to move the latch catch from the latched position to the unlatched position and to simultaneously grasp the catch with the hand at a location permitting removal of the cage from the shelf with the hand.

In order to prevent leakage and consequent cage flooding, additional steps preferably comprise, during the positioning step, 1) sealing the male fitting of the coupling against the female fitting, 2) lifting a valve core of the female fitting from an internal seal of the female fitting, and 3) sealing the male fitting against the internal seal.

Other objects, features, and advantages of the invention will become more apparent to those skilled in the art from the following detailed description and the accompanying drawings. It should be understood, however, that the detailed description and specific examples, while indicating preferred embodiments of the present invention, are given by way of illustration and not of limitation. Many changes and

BRIEF DESCRIPTION OF THE DRAWINGS

Preferred exemplary embodiments of the invention are illustrated in the accompanying drawings in which like reference numerals represent like parts throughout, and in which:

FIGS. 15a–15e are partial sectional side elevation views of a fourth coupling usable in the water docking system of FIGS. 1–5 and illustrating the sequence of the coupling of the male fitting to the female fitting.

DETAILED DESCRIPTION OF THE PREFERRED EMBODIMENTS

1. Resume

Figure 1:
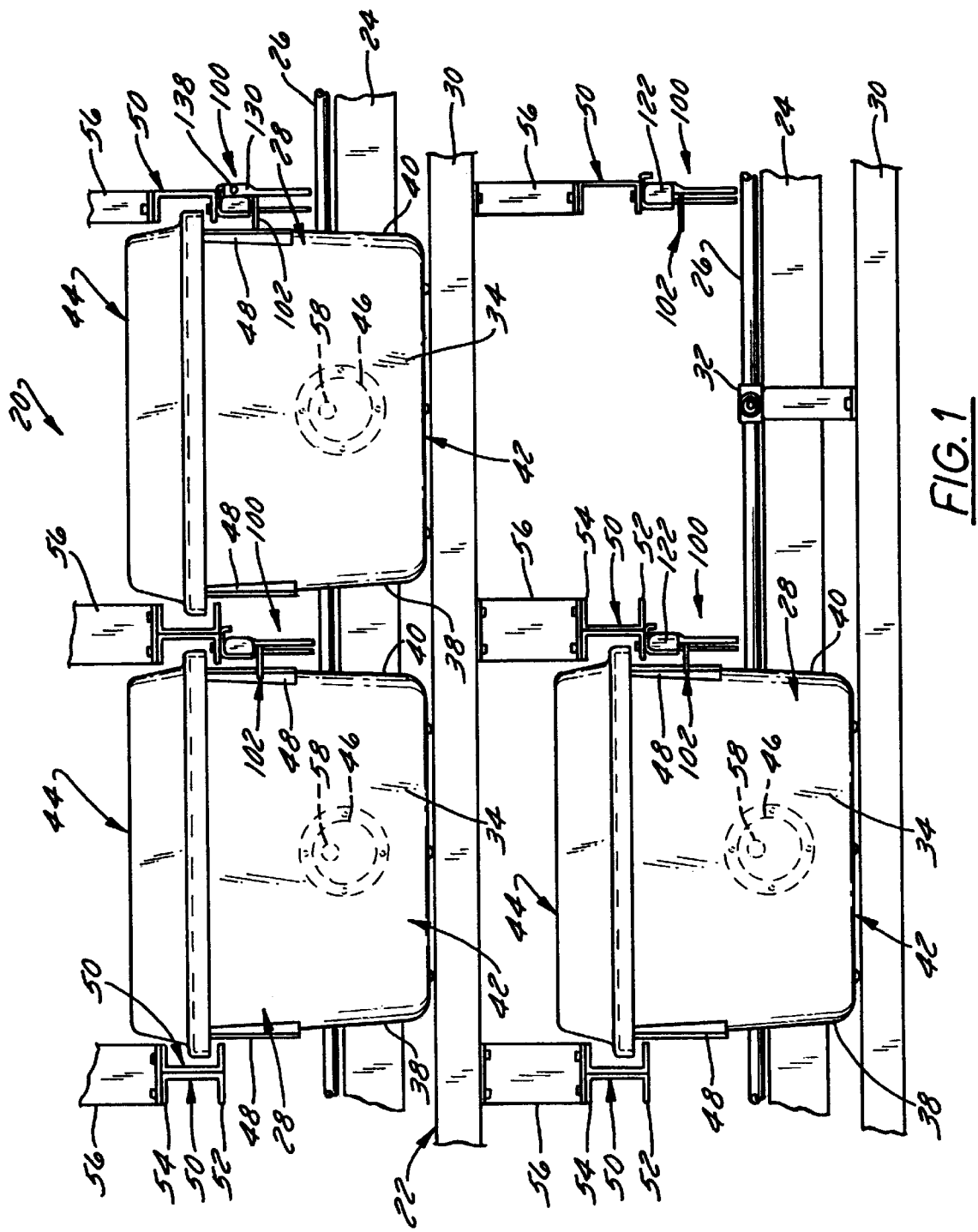
FIG. 1 is front elevation view of a cage and rack system employing a water docking system that includes a latch mechanism and a water coupling constructed in accordance with a preferred embodiment of the present invention.

A cage and rack system is disclosed that includes a shelf, at least one cage, and a water docking system for holding the cage in a position on the shelf and a cage-mounted animal watering valve coupled to a water manifold so as to assure the supply of water to the watering valve without leakage. The cage and rack system further includes a water docking system that comprises, inter alia, a latch mechanism and a coupling. The latch mechanism includes a latch catch which is movable 1) from an unlatched position in which it is disengaged from the cage and permits removal of the cage from the rack 2) to a latched position holding the cage in its docked position. The coupling may comprise either a friction-fit quick-connect coupling, an active locking quick-connect coupling, or a passive locking quick-connect coupling. A male fitting of the coupling is designed to prevent leakage by sequentially engaging two internal seals of the female fitting so as to first seal against the female fitting and then open an internal valve element of the female fitting. The sealing elements may be formed from distinct seals or spaced portions of a combined seal.

2. System Overview

Referring now to the drawings and to FIGS. 1–4 in particular, a portion of a cage and rack system 20 is illustrated. The cage and rack system 20 includes a rack 22, an air manifold 24, a water manifold 26, and a plurality of cages 28. As is conventional, the rack 22 includes a support frame (not shown) and a plurality of shelves 30 which are mounted on the support frame and on which are supported the cages 28. The shelves 30 are arranged in vertically spaced rows, and two shelves 30 are preferably, but not necessarily, provided in each row in a back-to-back relationship.

The air supply manifold 24 and associated air supply tubes, supply valves, and exhaust valves (not shown) are conventional and, accordingly, will not be detailed. The water manifold 26 and the associated supply and drain valves (not shown) are also conventional and likewise will not be detailed. A plurality of nipples 32 are aligned with the air supply tubes and extend outwardly from the water manifold 26 towards the cages 28 for receiving the couplings 150 as detailed below.

The cages 28 are also conventional. Each cage 28 includes front and rear end walls 34, 36 respectively, and a pair of opposed sidewalls 38, 40 connecting the walls 34 and 36 to one another. Each cage 28 additionally includes an enclosed base 42 capped with a filter bonnet 44. The filter bonnet may have an internal filter for preventing the transfer of air from one cage to another. The rear wall 36 of the base 42 of each cage 28 has an opening formed therein for accommodating a grommet 46. The grommet 46 has apertures formed therethrough for accommodating 1) a water coupling 150 of the docking system detailed below and 2) the air tube (not shown). The illustrated cage 28 also includes vertically-extending ribs 48 located at the corners thereof to facilitate stacking. Ribs 48, if present, also serve as a convenient abutment for the latch mechanism 100 detailed below. However, it should be emphasized that the invention is equally applicable to cages lacking such ribs.

Each cage 28 is aligned and properly positioned with respect to the associated air supply tube and nipple 32 by a pair of longitudinally-spaced cage guide assemblies 50. The cage guide assemblies 50 associated with each shelf 30 are suspended from the bottom of a vertically adjacent shelf 30 by mounting brackets 56 and are mounted back-to-back at all locations except the ends of the rack. Each cage guide assembly 50 is substantially U-shaped and includes a pair of arms 52, 54 which generally surround the portion of the cage 28 at which the bonnet 44 overlies the base 42.

Figure 9:
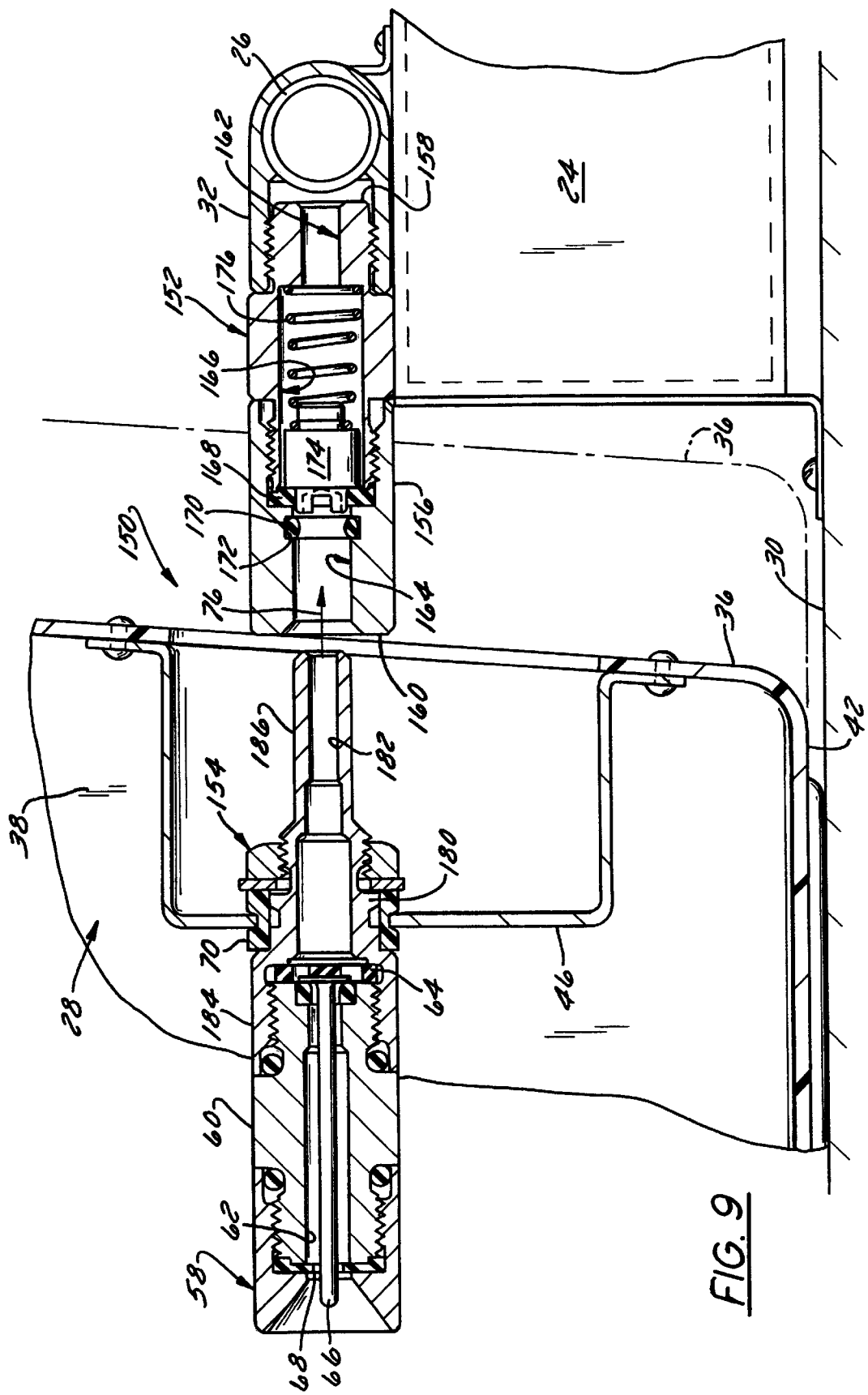
FIG. 9 is a sectional side elevation view of a first coupling usable the water-docking system of FIGS. 1–4 and of the corresponding portions of the cage and rack system and illustrating the male fitting of the coupling in a position in which it would be located just prior to insertion into the female fitting.

A male fitting 154 of the quick-connect coupling 150 receives an animal watering valve 58 on its outer end. A holder 70 is mounted in the grommet 46 and receives the male fitting 154 such that the watering valve 58 extends into the cage 28 and a plug 186 of the male fitting 154 extends inwardly or rearwardly from the cage 28. The animal watering valve 58 preferably comprises an animal-actuated valve opened by the tongue or snout of an animal housed in the cage. Towards this end, and referring to FIG. 9, the watering valve 58 includes a generally cylindrical body 60 having a bore 62 formed axially therethrough. Disposed within the bore 62 are a diaphragm 64 forming a valve element, an animal-actuated valve stem 66, and an elastomeric shield 68. Valves of this type are disclosed, e.g., in U.S. Pat. No. 5,337,696 and U.S. patent application Ser. No. 08/294,738 (now U.S. Pat. No. 5,501,177), both of which are assigned to the assignee of the present application and are hereby incorporated by reference in their entirety.

A separate water docking system is associated with each cage 28. Each water docking system includes a latch mechanism 100 and a coupling 150. The latch mechanism 100 and coupling 150 of each water docking system interact to selectively latch the associated cage 28 in a docked position in which water is supplied to the animal watering valve 58 from the water manifold 26 without leakage. The latch mechanism 100 and coupling 150 will now be described in sequence.

3. Latch Mechanism

The latch mechanism 100 includes a latch catch 102 which is movable 1) from an unlatched position in which it is disengaged from the cage 28 and permits removal of the cage from the shelf 30 2) to a latched position in which it positively engages the front wall 34 of the cage 28 and holds the cage 28 in a docked position in which the male fitting 154 of the coupling 150 is sealingly inserted in the female fitting 152 so as to permit water to flow therethrough. Preferably, the latch mechanism 100 is also capable of providing a visual indication of an unlatched condition. Referring now to the drawings and to FIGS. 1–7 in particular, the preferred latch mechanism 100 includes a stationary support plate 104, a pivot arm 106, a latch catch 102, a spring 108, and an indicator assembly 110.

The stationary support plate 104 is fixedly mounted on the shelf 30 adjacent the cage 28. It is conceivable that the plate 104 could extend above or beneath the cage 28. However, plate 104 is preferably configured to extend generally in parallel with the sidewalls 38, 40 of the cage and, even more preferably, is located adjacent the sidewall 40. In the illustrated embodiment, the support plate 104 comprises a notched rectangular plate extending in parallel with and located directly beneath the lower leg 52 of the cage guide assembly 50. The support plate 104 is suspended from the lower leg 52 by an L-bracket 112 and is connected to the L-bracket 112 by bolts 114 or the like. The L-bracket 112 has a lower leg 116 which receives the support plate 104 and an upper leg 118 which is bolted or otherwise affixed to the lower leg 52 of channel guide 50. A rectangular tab 120 extends downwardly from a central portion of the upper leg 118 so as to serve as a stop for the pivot arm 106. An additional flange 122 extends rearwardly from the outer end of the support plate 104, i.e., away from the cage 28, so as to serve as a shield of the indicator assembly 110 as detailed below.

The pivot arm 106 is designed to be swingable about a vertical axis 128 1) from a first position in which the pivot arm 106 extends at least substantially in parallel with the support plate 104 and in which an outer end of the pivot arm 106 is located adjacent the support plate 104 2) to a second position in which the outer end of the pivot arm 106 is spaced transversely from the support plate 104. To this end, the illustrated pivot arm 106 comprises a generally rectangular plate 124 having inner and outer ends. The inner end of plate 124 is pivotally attached to the support plate 104 by a hinge 126. The outer end of the pivot plate 124 is bent rearwardly away from the cage 28 so as to define an indicator mount 130 at its upper end. Finally, a tab 132 extends upwardly from a central portion of the pivot plate 124 for mating engagement with the stop 120 of the support plate 104.

Figure 3:
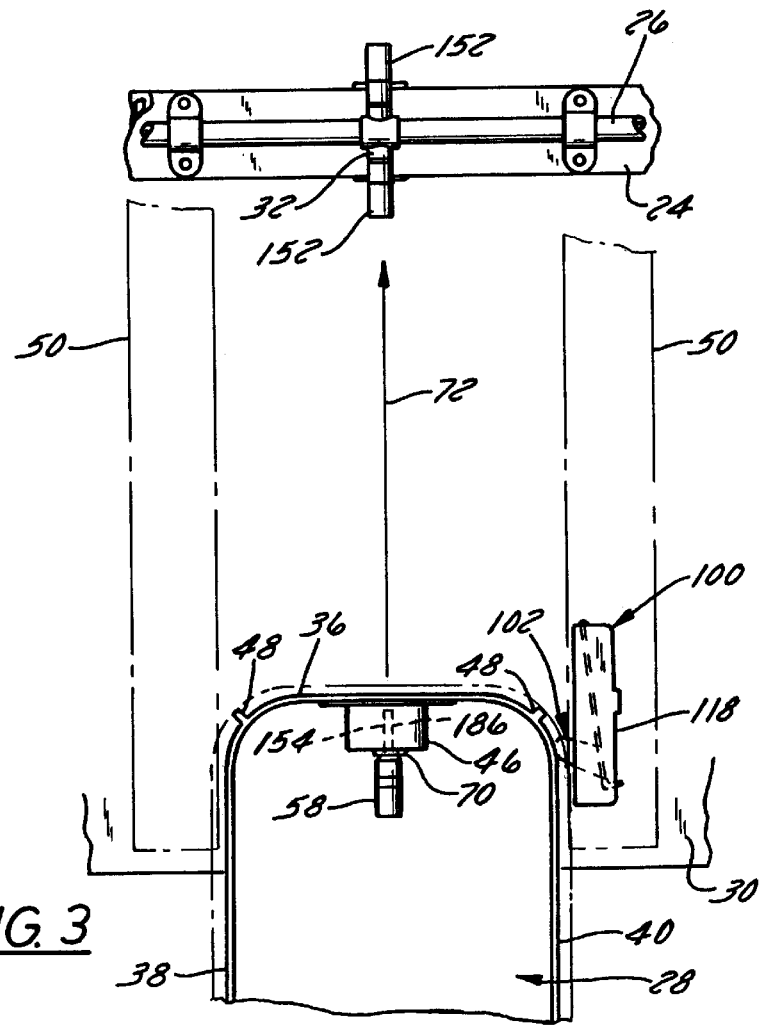
FIG. 3 is a top plan view illustrating the manner in which a cage of the cage and rack system of FIGS. 1 and 2 is inserted onto a shelf of the rack thereof.
Figure 4:
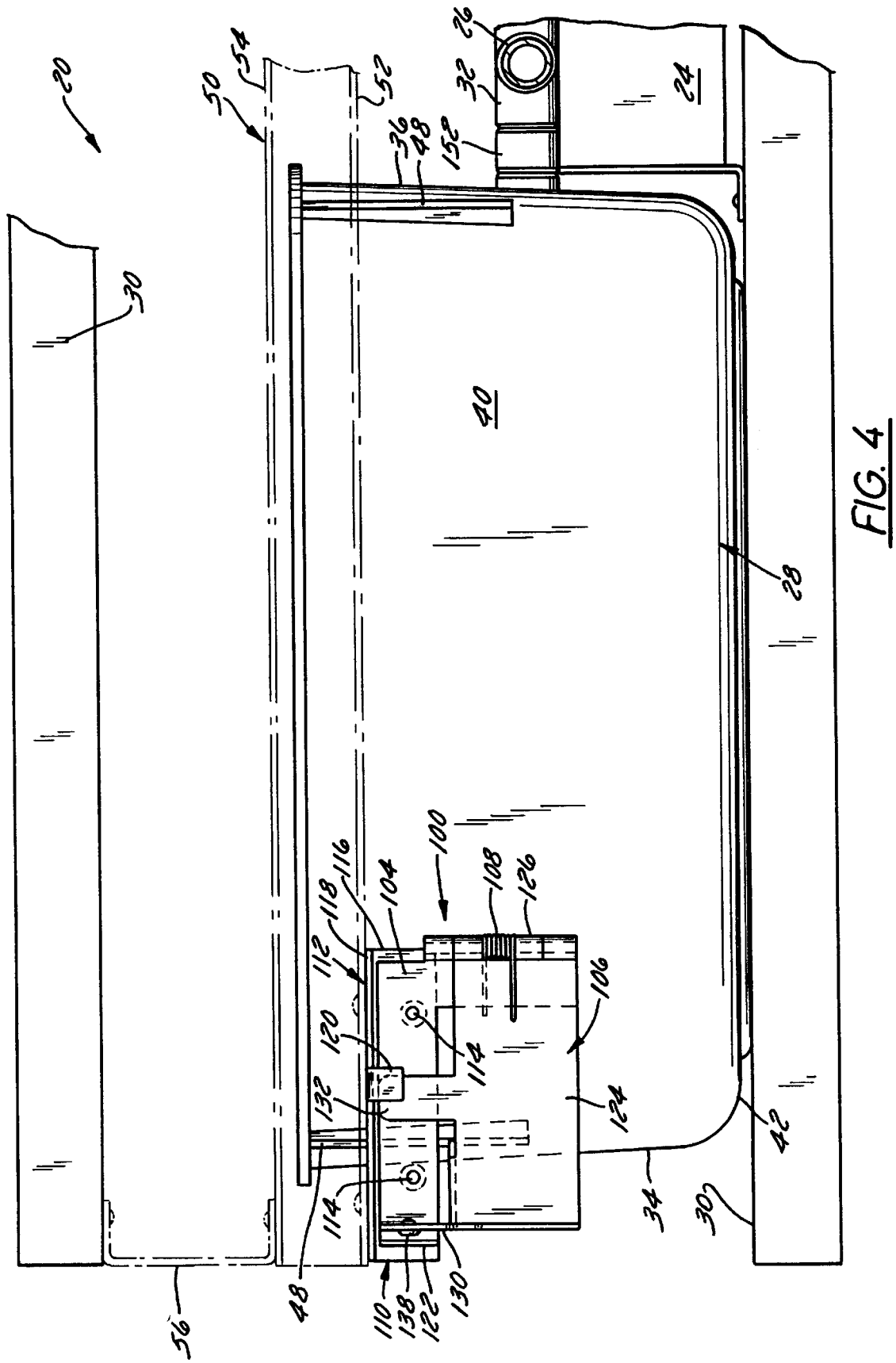
FIG. 4 is a side elevation view of a cage of the cage and rack system of FIGS. 1–3, illustrating the cage docked to the water manifold.
Figure 5:
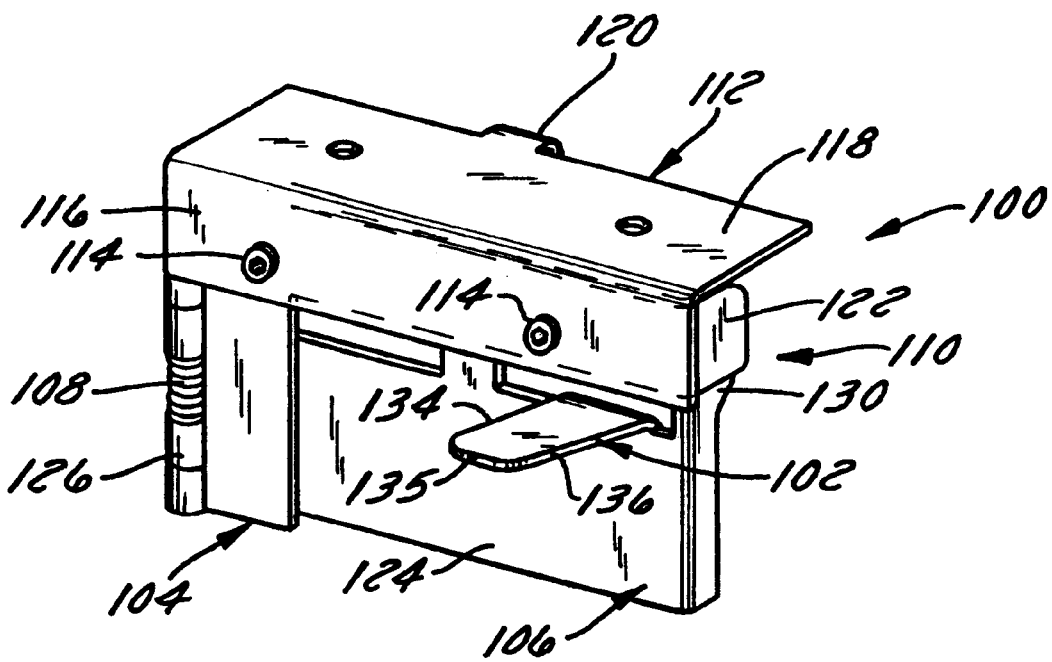
FIG. 5 is a perspective view of a latch mechanism usable in the water docking system of FIGS. 1–4, viewed from in front of the latch mechanism and illustrating the latch mechanism in a latched position.
Figure 6:
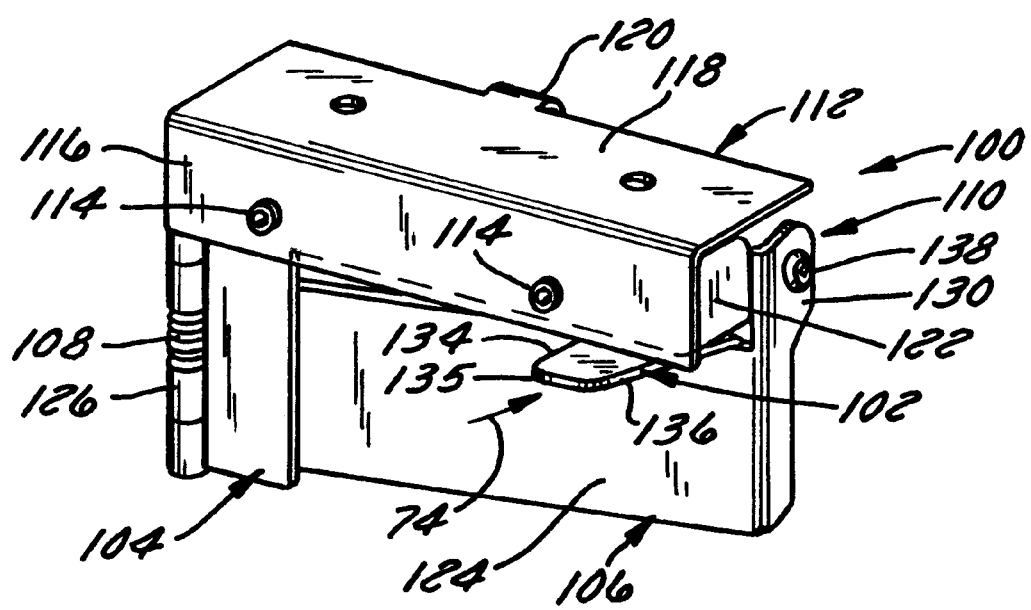
FIG. 6 is a perspective view of the latch mechanism of FIG. 5, viewed from the front side of the latch mechanism and illustrating the latch mechanism in an unlatched position.

The latch catch 102, preferably formed from the same plate 124 as the pivot arm 106, extends forwardly from the upper-edge of the outer end of the pivot arm 106 so as to engage the front wall 34 of the cage 28 to hold the cage 28 in its docked position when the pivot arm 106 is in its first position and so as to be disengaged from the cage 28 when the pivot arm 106 is in its second position. "Disengaged" as used herein does not mean that the latch catch 102 cannot touch the cage 28. Rather, "disengaged" means that the latch catch 102 permits sliding movement of the catch 102 as seen in FIG. 3 when in its unlatched position.

Figure 8C:
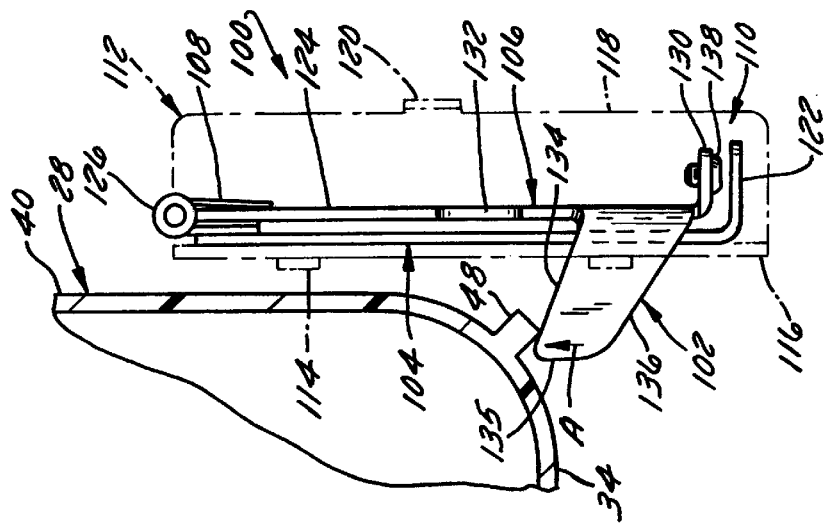
FIGS. 8a–8c are partially cut-away top plan views illustrating the latch mechanism of FIGS. 5–7 in various operational positions.
Figure 8B:
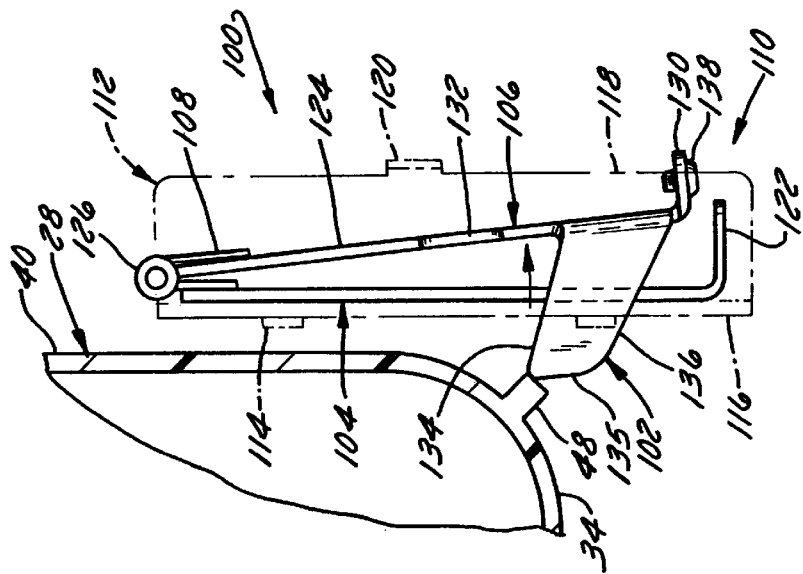
Figure 8A:
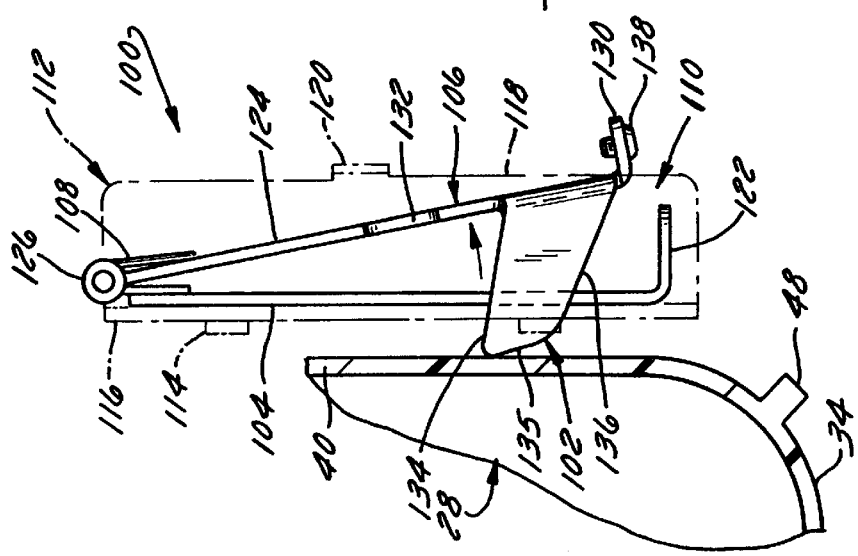

In the illustrated embodiment, the latch catch 102 is generally rectangular in shape so as to present inner and outer edges 134 and 136 joined by a front edge or tip 135. Both the inner edge 134 and the outer edge 136 are inclined forwardly and rearwardly with respect to the plane of the pivot arm 106. Preferably, the inner edge 134 of the latch catch 102 is angled such that, when the pivot arm 106 swings from its first or latched position to its second or unlatched position, the latch catch 102 does not apply significant additional forces in the direction of vector A in FIG. 8c and therefore does not significantly inhibit pivot arm swinging. Accordingly, the resistance to latch catch motion is only sliding friction of the contact point between the cage 28 and the latch catch 102. The angle on the outer edge 136 of the latch catch 102 causes the latch catch 102 to swing away from the cage 28 when the cage 28 is inserted onto the shelf 30 as illustrated in FIGS. 3, 8a and 8b, thereby to minimize interference with the sliding motion of the cage 28.

As mentioned above, an indicator assembly 110 is preferably included in the latch mechanism 100 to provide an easily visually discernable indication that the cage 28 is not properly docked with the water manifold 26. Providing such an indication is important because, if the cage 28 is not properly docked, no water will be supplied to the cage 28, and the animals housed therein may become dehydrated or even die. A variety of mechanical or electrical indicator assemblies may be suitable for this purpose. In the illustrated and preferred embodiment, the indicator assembly includes the shield 122 as described above and a simple mechanical flag-type indicator which is provided in the form of an indicator button 138. The indicator button 138, preferably colored red for maximum visual observability, is mounted on the outer flange or indicator mount 130 of the pivot arm 106. When the pivot arm 106 is in its first or latched position, best seen in FIGS. 5, 8c and the right half of FIG. 2, indicator button 138 is hidden from view by the outer flange or shield 122 of the support plate 104. When, on the other hand, the cage 28 is not properly docked as illustrated in the right half of FIG. 2 and in FIGS. 8a and 8b, the pivot arm 106 will be forced by the cage 28 to pivot in the direction of arrow 74 in FIG. 6 away from the support plate 104 such that the indicator button 138 is pivoted away from the shield 122 and is readily visible to even a casual observer.

4. Construction of Water Coupling

As discussed above, one problem associated with many water couplings is that, if the male fitting of the coupling is not fully inserted into the female fitting, the coupling could leak, potentially flooding the entire rack and causing discomfort, illness, or even death to many or all of the animals housed in the cages on that rack. The inventive coupling eliminates or at least drastically inhibits the occurrences of such flooding by preventing the internal valve of the female fitting from opening until after the male fitting of the coupling is sealed to the female fitting. Preferably, the coupling 150 also provides redundancy in seals such that, even if one of the seals in the coupling fails, seal integrity will be maintained by a second seal. Referring to the drawings and to FIGS. 9 and 10a–10d in particular, a preferred friction-fit coupling 150 meeting these criteria is illustrated and includes a female fitting 152 and a male fitting 154.

The female fitting 152 includes a generally cylindrical two-part body 156 having inlet and outlet ends 158 and 160 and being threadedly attached to the nipple 32 at its inner or inlet end 158. The body 156 has a bore 162 formed therein which preferably extends axially through the body 156 from the inlet end 158 to the outlet end 160. The bore 162 is stepped so as to have an outer portion 164 having a first diameter and an inner portion 166 having a second diameter which is larger than the first diameter. A first annular seal 168 is located in the inner portion 166 and is mounted on a shoulder formed by the step in the bore 162. A second annular seal or O-ring 170 is mounted in a groove 172 formed in the outer portion 164 of bore 162. A valve core 174 is located in the inner portion 166 of bore 162 and is movable axially, against the force of a spring 176, from a first position, illustrated in FIGS. 9, 10a, and 10b, in which it is sealingly seated on the first seal 168, to and beyond a second position, illustrated in FIG. 10c, in which it is spaced from the first seal 168 so as to permit water to flow therepast.

Figure 2:
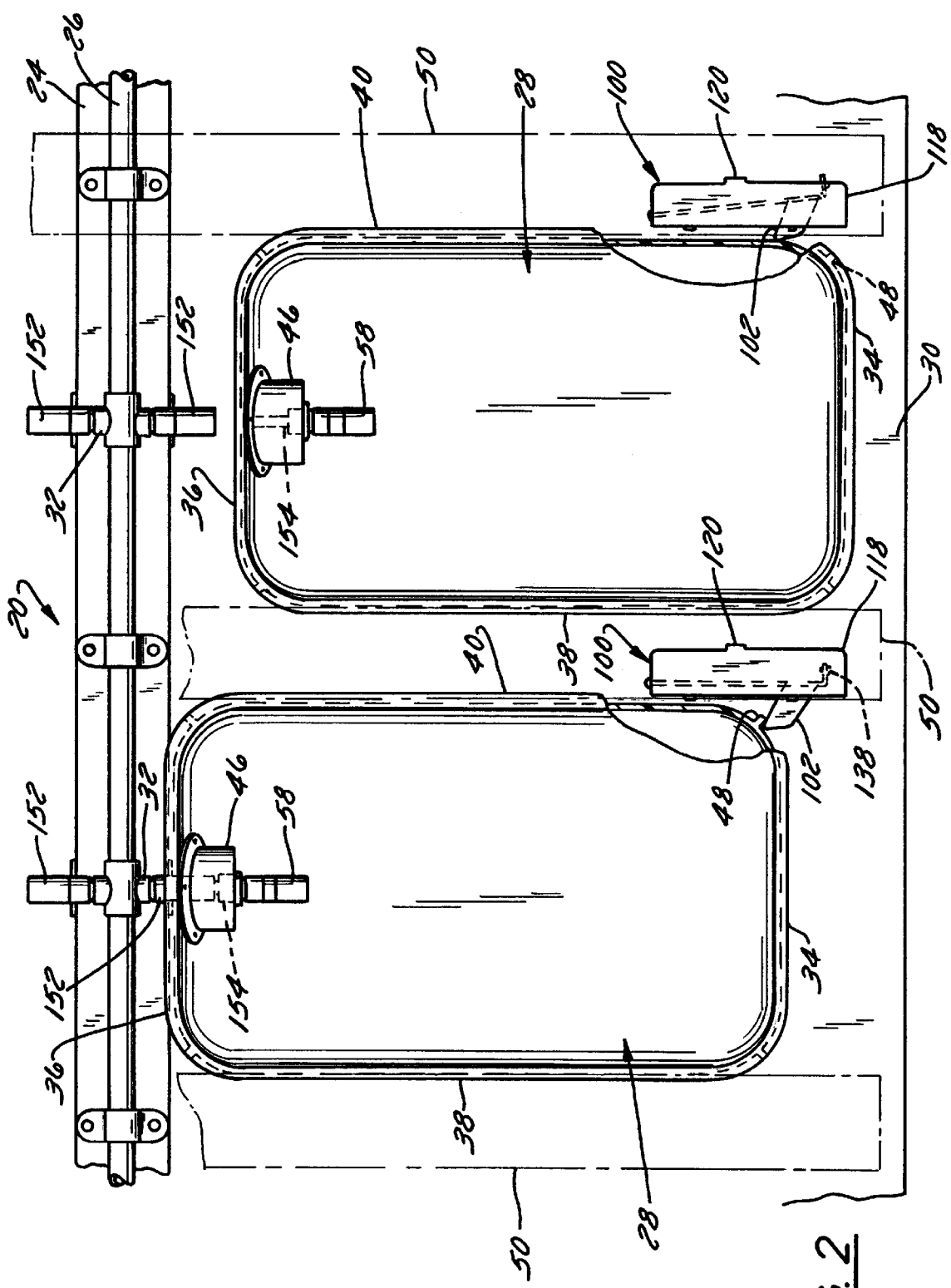
FIG. 2 is a top plan view of a portion of the cage and rack system of FIG. 1.
Figure 7:
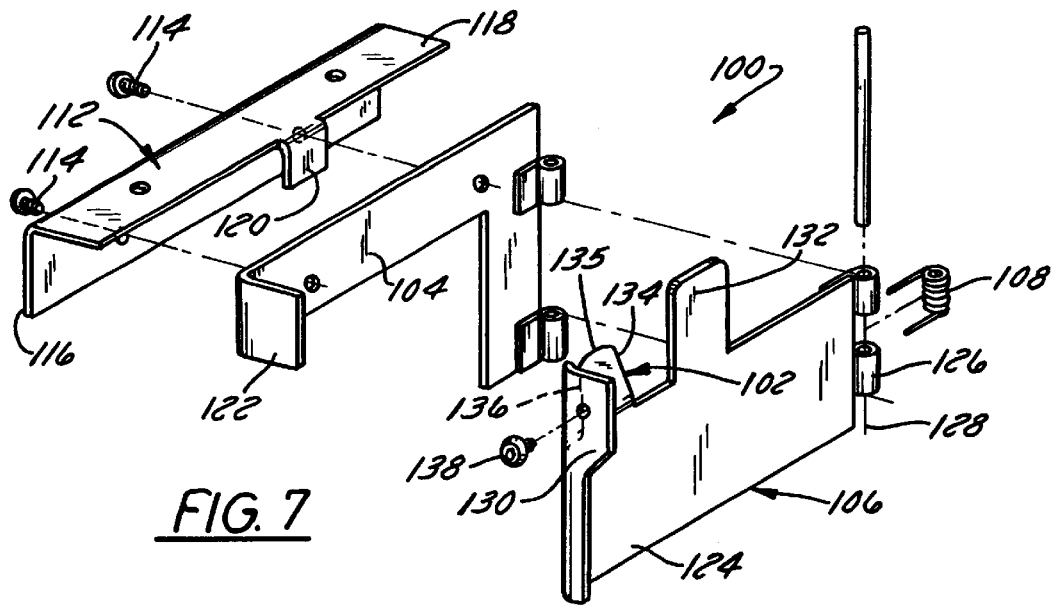
FIG. 7 is an exploded perspective view of the latch mechanism of FIGS. 5 and 6.
Figure 10A:
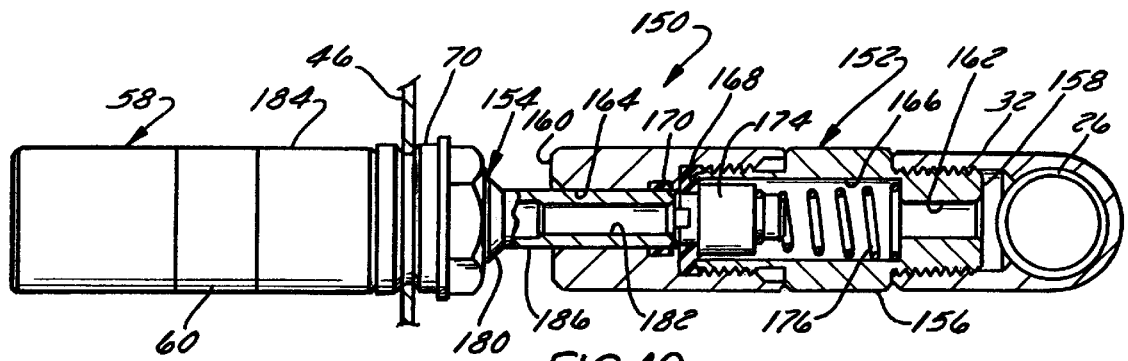
FIGS. 10a–10d are partial sectional side elevation views of the coupling of FIG. 9 and of the corresponding portions of the cage and rack system and illustrating the sequence of the coupling of the male fitting to the female fitting.
Figure 10B:
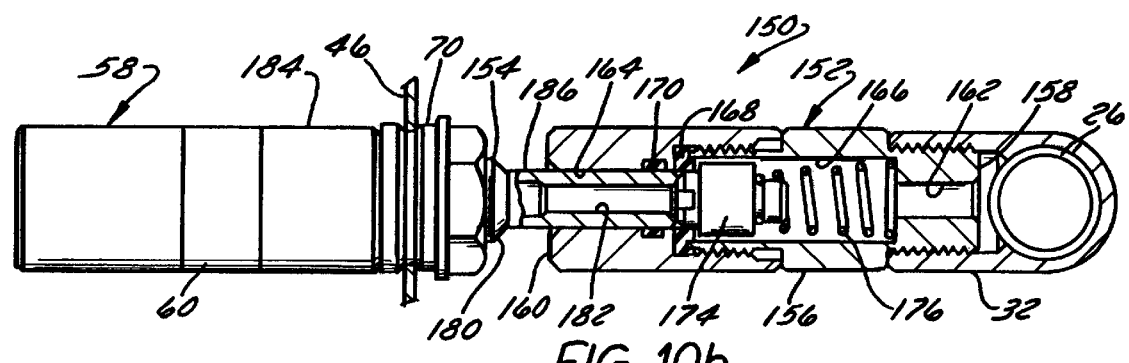
Figure 10C:
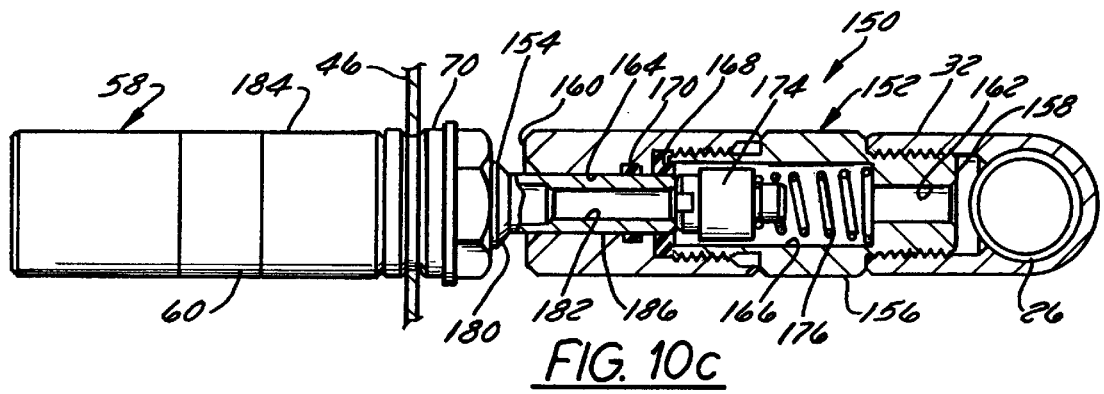
Figure 10D:
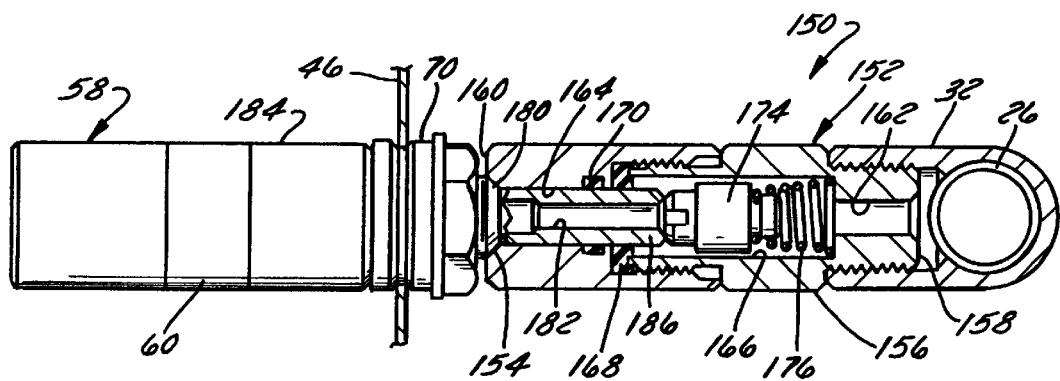

The male fitting 154 comprises a generally cylindrical body 180 having a bore 182 formed axially therethrough. An outer portion 184 of the body 180 is threadedly connected to the watering valve 58 and is bolted onto the holder 70. An inner end portion of the body 180 forms a generally cylindrical plug 186 which extends inwardly from the outer portion and which is dimensioned to be slidably received in the outer portion 164 of the bore 162 in the female fitting 152 with a slight clearance therebetween. The plug 186, the first and second seals 168 and 170, and the valve core 174 are so dimensioned and configured that, when the plug 186 is inserted axially into the bore 162 in the female fitting 152 from the outer or outlet end thereof, 1) the outer radial periphery of the plug 186 slidingly seals against the second seal 170 as illustrated in FIG. 10a, 2) the plug 186 then lifts the valve core 174 off the first seal 168 as illustrated in FIG. 10b, thereby permitting water to flow past the valve core 174, through the male fitting 154, and to the watering valve 58, and 3) the outer radial periphery of the plug 186 then slidingly seals against the first seal 168 as illustrated in FIG. 10c. Without the second seal 170, the coupling 150 could leak when the male fitting 154 is in the position illustrated in FIG. 10b because water could flow past the outer radial periphery of the valve core 174 and out of the female fitting 152 of the coupling 150. The second seal 170 prevents this leakage and consequent possible flooding. FIG. 10d illustrates that the plug 186, valve core 174, and bore in the female fitting 152 are dimensioned to permit some over-travel of the plug 186 into the bore 162. As will be detailed below, this over-travel facilitates operation of the latch mechanism 100.

5. Operation of Docking System

The operation of the inventive docking system, although believed to be apparent from the preceding discussion, will be briefly discussed in order to highlight the advantages of the present invention.

FIG. 1 illustrates a typical configuration of cages 28 on the rack 22. Three cages 28 are illustrated, with the two cages shown on the left side of the drawing being in a docked position and the cage in the upper right portion being shown in an undocked position. The portion of the rack 22 seen in the lower right portion of the drawing is empty and ready to receive a cage. That cage 28 is docked to the air manifold 24 and water manifold 26 simply by setting the rear or inner end 36 of the cage 28 on the front or outer end of the shelf 30 and sliding it back along the shelf 30 in the direction of arrow 72 in FIG. 3. The pivot arm 106 of the latch mechanism 100 swings in the direction of arrow 74 in FIG. 6 at this time so as permit sliding movement of the cage 28 as illustrated in FIGS. 3, 8a, and 8b. The cage 28 is guided by the channel guide assemblies 50 so that the male fitting 154 of the coupling 150 is guided towards the female fitting 152 as illustrated e.g., by the arrow 76 in FIG. 9. The cage 28 continues to slide onto the shelf 30 as the plug 186 of the male fitting 154 slides progressively further into the bore 162 in the female fitting 152 as illustrated sequentially in FIGS. 10a–10d. Although the coupling 150 is in its operative position in FIG. 10c, the rib 48 on the cage 28 does not clear the tip 135 of the latch catch 102 until just before the male fitting 154 achieves its over-travel position illustrated in FIG. 10d, at which time the latch catch 102 may pivot, under the force of spring 108, to the position illustrated on the left half of FIG. 1, the left half of FIG. 2, and in FIG. 5. (Also, compare FIG. 8b to FIG. 8c). The cage 28 is now free to rebound so that the coupling 150 is again in the position illustrated in FIG. 10c. At this time, the cage 28 is docked to the water manifold 26 and to the air supply manifold 24 and is latched in this position by the latch mechanism 100, and more particularly, by the latch catch 102 as seen most clearly in FIG. 8c.

Assuming now that one wishes to remove a cage 28 from the rack 22, e.g., for cleaning or for access to the animals housed therein, he or she grasps the sidewalls 38 and 40 of the cage 28 with both hands near the top portion thereof. The latch mechanism 100 is positioned so that, when one grasps the sidewall 40 of cage 28 with his or her right hand, his fingers will be positioned in the notch of plate 104 so as to engage and pivot the pivot arm 106, against the force of the spring 108, away from cage 28 while simultaneously sliding the cage 28 off the shelf 30. Interference between the pivot arm 106 and any adjacent cages 28 upon pivot arm swinging is prevented by the stop 120 which prohibits excessive pivotal motion of the pivot arm 106.

It will therefore be appreciated that removing the cage 28 from the rack 22 and unlatching the latch mechanism 100 can be performed in a single operation and is dramatically simplified compared to devices which require separate decoupling and removal operations.

As discussed above, the plug 186 on the male fitting 154 of the coupling 150 seals against the seal 170 before it lifts the valve core 174 off the seal 168. Accordingly, if for any reason the cage 28 is left in a partially-docked position illustrated in FIG. 10b in which the valve core 174 is lifted from the seal 168 but the male fitting 154 is not sealed onto the seal 168, leakage and consequent cage flooding are prevented by the seal 170. Moreover, once the cage 28 is fully docked as illustrated in FIG. 10c, the plug 186 is sealed to the body 156 by both seals 168 and 170. These seals provide considerable redundancy, preventing leakage should either seal fail.

If for any reason a cage 28 is not inserted all the way onto the shelf 30 and, accordingly, is not docked to the water manifold 26, the pivot arm 106 will be prevented from pivoting into its latched position via engagement of the tip 135 of the latch catch 102 with the side 40 of the cage 28. Accordingly, the colored indicator flag or button 138, which is normally hidden by the shield 122 when the latch mechanism 100 is latched, is open to view as illustrated in the upper right hand portion of FIG. 1, the right half of FIG. 2, FIG. 6 and FIGS. 8a and 8b, and provides an easily discernable visual indication that the latch mechanism 100 is unlatched and, accordingly, that the cage 28 is not docked. Providing this type of easily discernable visual indication of an undocked cage condition is important because 1) animals cannot obtain water when the cage 28 is not docked to the manifold 26 and may become dehydrated, or even die and because 2) a single attendant may be responsible for hundreds or even thousands of cages and has little time to inspect each individual cage.

It can thus be seen that the inventive docking system in essence achieves the best of both worlds. It permits the use of a friction-fit coupling in the system, thereby facilitating cage removal from the rack while simultaneously inhibiting coupling leakage and consequent rack flooding often associated with friction-fit couplings. It is also relatively simple to fabricate and to install and is much easier to operate than comparative prior art docking systems.

Of course, the inventive coupling and the inventive latch mechanism could be used in other docking systems. Other quick-connect couplings usable with the latch mechanism 100 in the inventive docking system will now be detailed.

6. Construction and Operation of Active Locking Quick-Connect Coupling

Figure 11A:
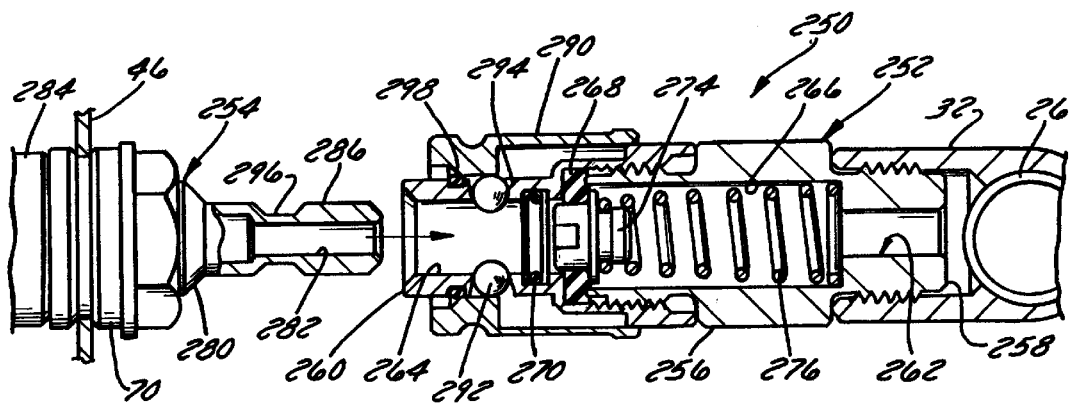
FIGS. 11a–11c are partial sectional side elevation views of a second coupling usable in the water docking system of FIGS. 1–5 and of the corresponding portions of the cage and rack system and illustrating the sequence of the coupling of the male fitting to the female fitting.
Figure 11B:
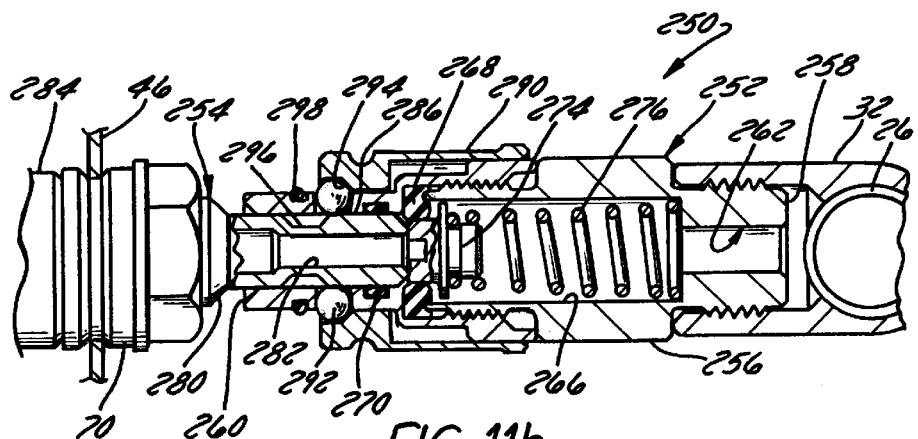
Figure 11C:
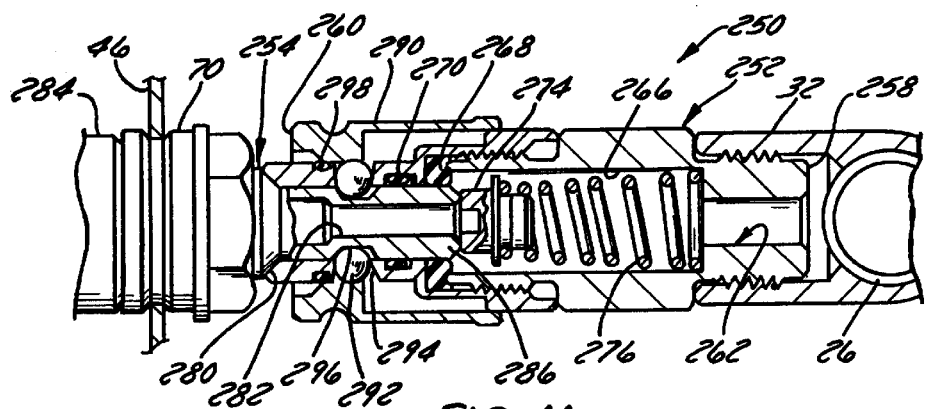

Referring now to FIGS. 11a–11c, a locking quick-connect coupling 250 usable with the water docking system described in Sections 2–5 above or in other applications is, in many respects, similar to the friction-fit coupling 150 described in Section 4 above. Elements of the coupling 250 corresponding to those of the coupling 150 are denoted by the same reference numerals, incremented by 100. The coupling 250 therefore includes a female fitting 252 and male fitting 254. The female fitting 252, like the female fitting 152 of the corresponding friction-fit coupling 150, includes a body 256 which is threadedly connectable to the nipple 32 and which has a stepped axial bore 262 formed therethrough having an outer portion 264 and an inner portion 266. Disposed in the axial bore 262 are first and second seals 268, 270, a valve core 274, and a spring 276.

The male fitting 254, like the male fitting 154 of the first embodiment, includes a body 280 having a bore 282 formed therethrough. The body 280 presents 1) an inner end 284 which is mounted on the grommet 46 by the holder 70 and which is connected to the animal watering valve 58 and 2) a plug 286. As in the first embodiment, the plug 286, the first and second seals 268 and 270, and the valve core 274 are so dimensioned and configured that, when the plug 286 is inserted axially into the bore 262 in the female fitting 252 from the outlet end thereof, the plug 286 first slidably seals against the second seal 270, then lifts the core 274 from the first seal 268, and then seals against the first seal 268.

In order to permit the coupling to function as a locking quick-connect coupling, the female fitting 252 is additionally provided with a collar 290 and a plurality of locking balls 292. The collar 290 is slidably mounted on the outer end of the body 256. The locking balls 292 are mounted in corresponding holes 294 in the body 256 and engage the outer radial periphery of the plug 286 on the male fitting 254 when the plug 286 is inserted into the bore 262. A retaining ring 298 keeps the collar 290 in place.

The collar 290 is movable 1) from a first position, illustrated in FIGS 11a and 11c, in which it forces the locking balls 292 into corresponding recesses 296 formed in the plug 286 of the male fitting 254 so as to prevent axial movement of the male fitting 254 with respect to the female fitting 252, 2) to a second position, illustrated in FIG. 11b, in which it permits the locking balls 292 to disengage the recesses 296 in the plug 286 thereby to permit axial movement of the male fitting 254 with respect to the female fitting 252. FIG. 11c actually illustrates the plug 286 in an over-travel position corresponding to the over-travel position of plug 186 of fitting 150 illustrated in FIG. 10d. In a normal, docked state occurring after the latch mechanism 100 is latched, the balls 292 would actually be located in the center or even with the inner ends of the recesses 296 in the plug 286.

The sealing sequence of the locking quick-connect coupling 250 is the same as the sealing sequence of the friction-fit quick-connect coupling 150 described above. Coupling 250 therefore exhibits at least most of the advantages of the friction-fit coupling described above. Moreover, by locking the coupling in its coupled position, it provides redundancy to the latch mechanism 100, should such redundancy be desired. Should this or other locking quick-connect couplings be employed in the docking system, a decoupler such as that disclosed in U.S. Pat. No. 5,337,696 should be employed to facilitate decoupling.

7. Construction and Operation of Second Non-Locking Quick-Connect Coupling

Figure 12:
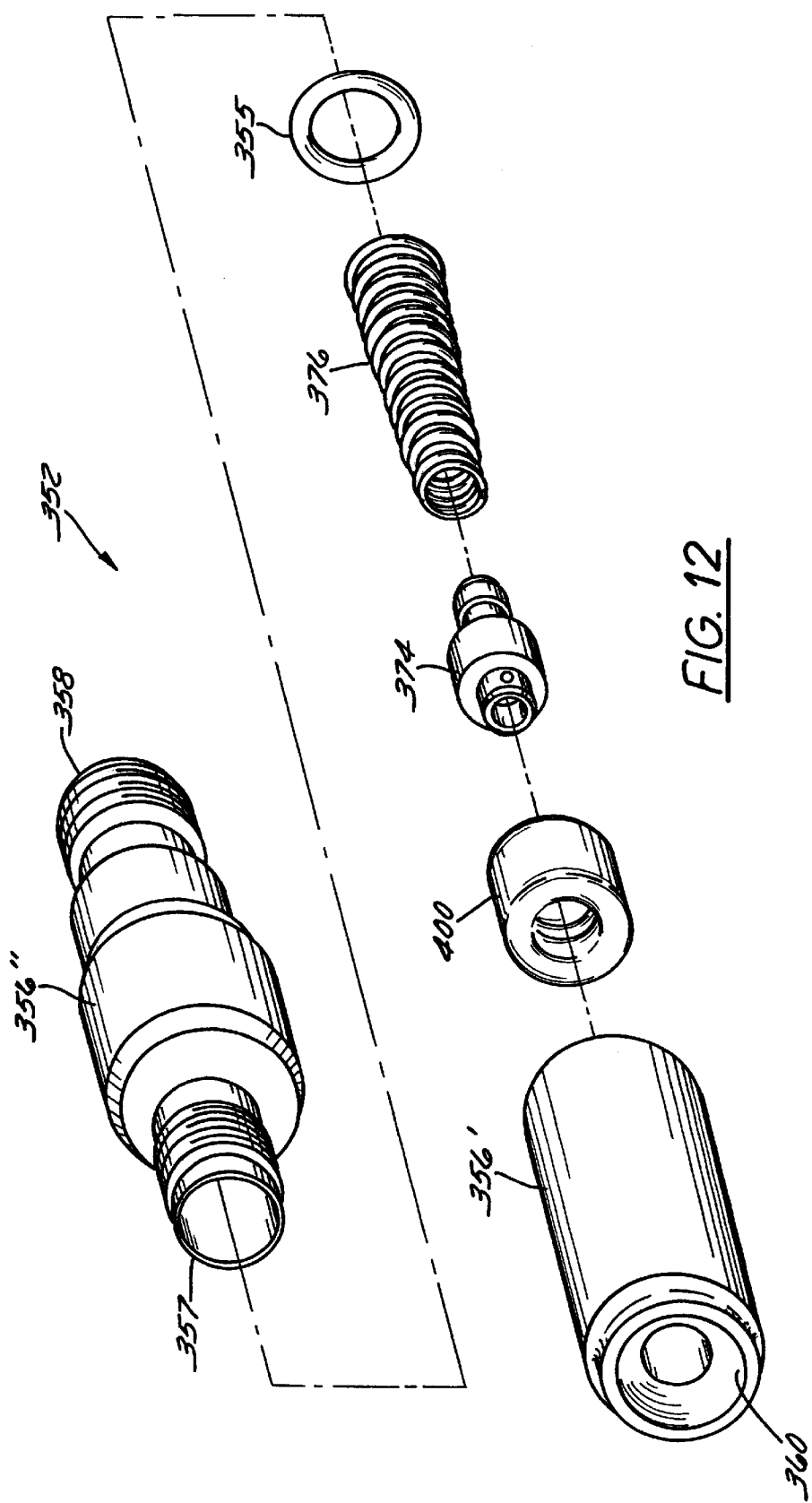
FIG. 12 is an exploded perspective view of a third coupling usable in the water docking system of FIGS. 1–5 and of the corresponding portions of the cage and rack system.
Figure 13A:
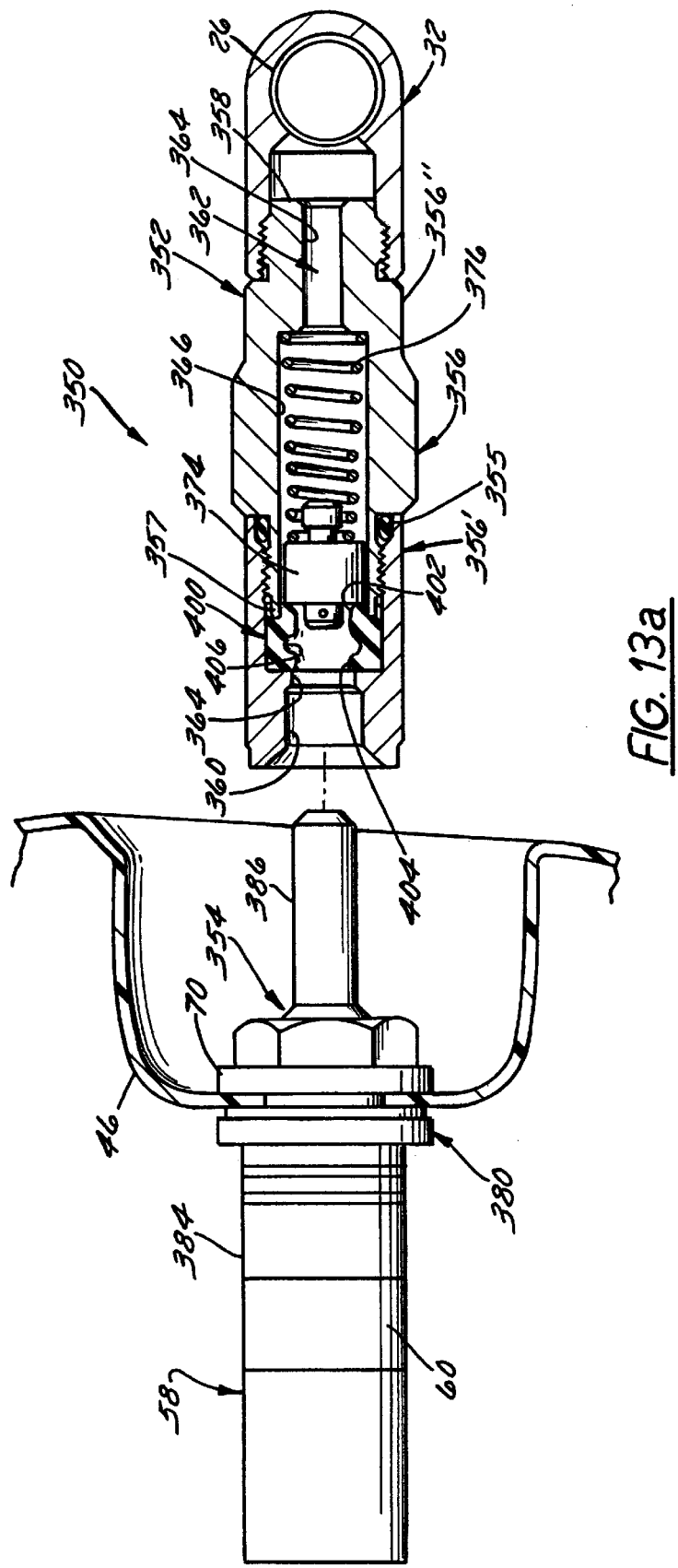
FIGS. 13a–13f are partial sectional side elevation views of the third coupling and of the corresponding portions of the cage and rack system and illustrating the sequence of the coupling of the male fitting to the female fitting.
Figure 13B:
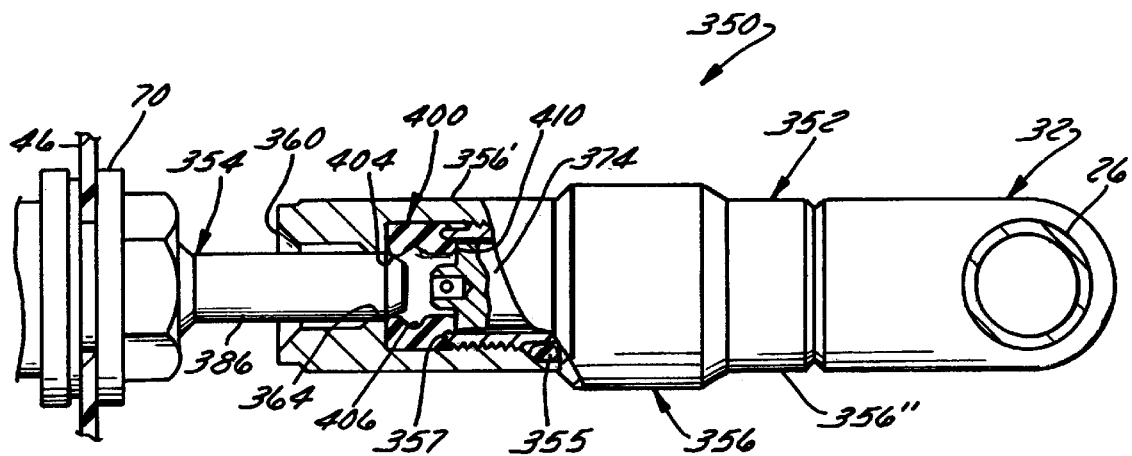
Figure 13C:
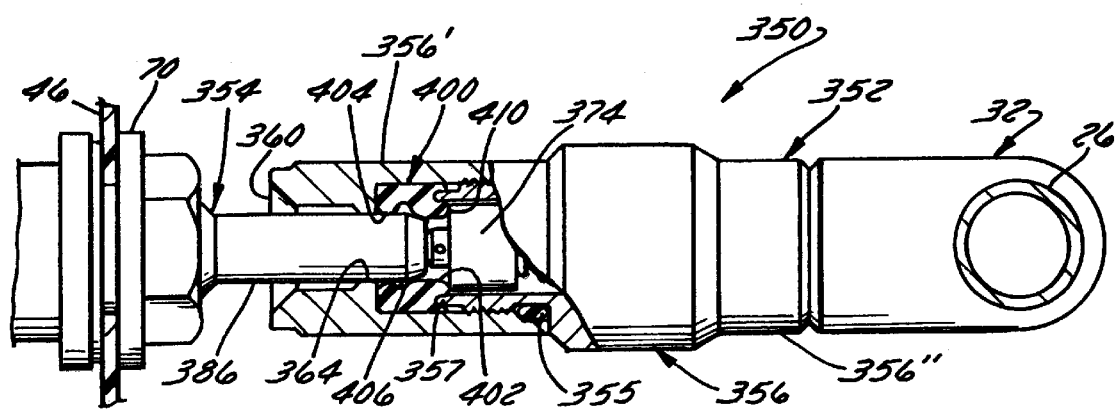
Figure 13D:
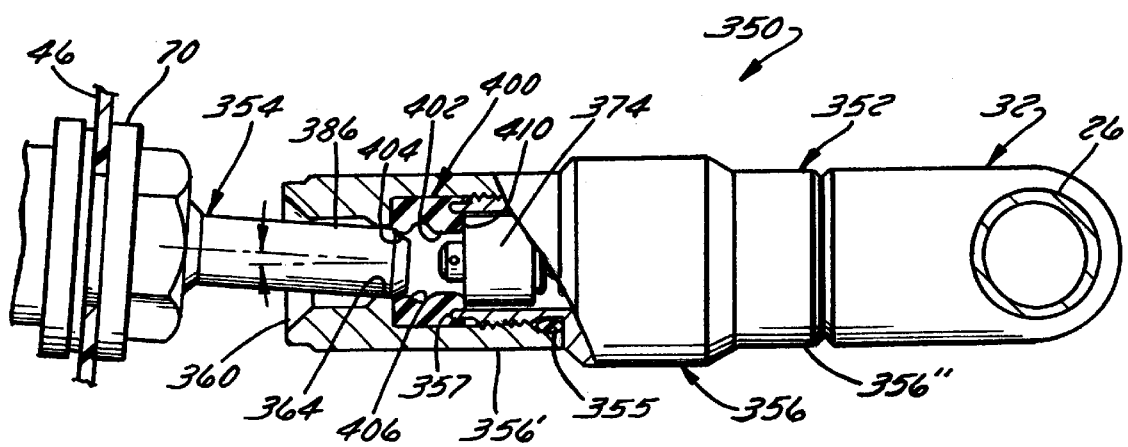
Figure 13E:
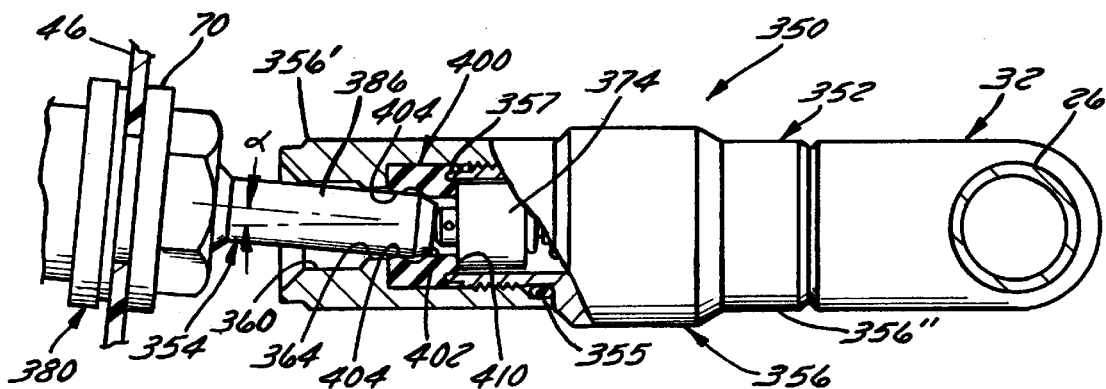
Figure 13F:
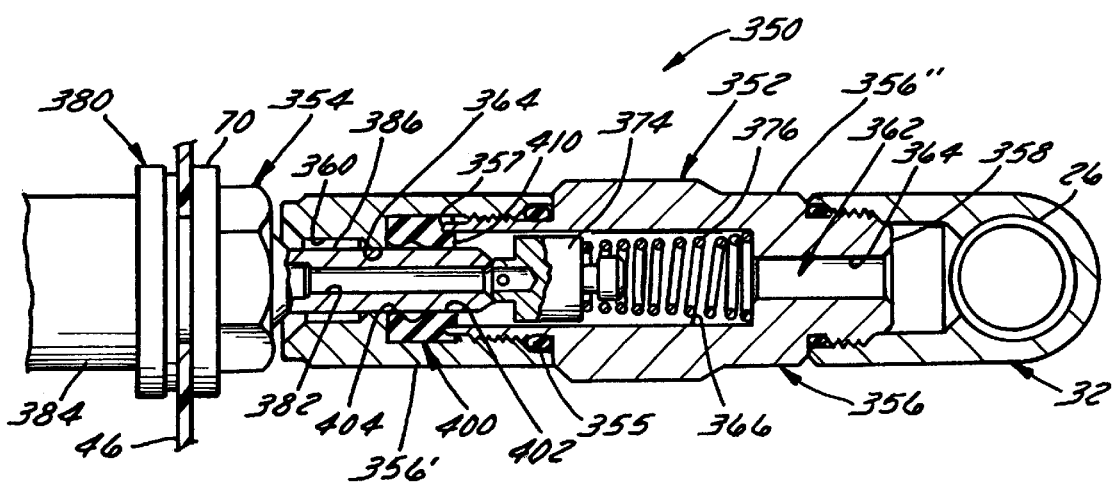
Figure 14:
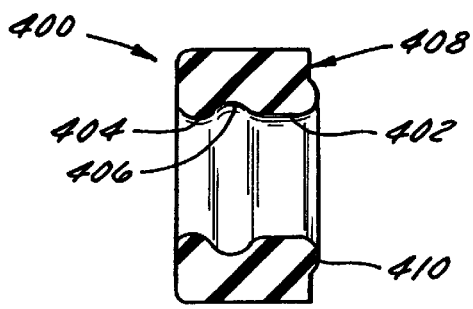
FIG. 14 is a sectional side elevation view of a combined seal of the coupling of FIGS. 12–13f.

Referring now to FIGS. 12–14, a non-locking quick-connect coupling 350 usable with the water docking system described in Sections 2–5 above or in other applications is, in many respects, similar to the friction-fit coupling 150 described in Section 4 above. Elements of the coupling 350 corresponding to those of the coupling 150 are denoted by the same reference numerals, incremented by 200. The coupling 350 therefore includes a female fitting 352 and male fitting 354. The female fitting 352, like the female fitting 152 of the corresponding friction-fit coupling 150, includes a generally cylindrical body 356 having inlet and outlet ends 358 and 360 and is threadedly attached to the nipple 32 at its inlet end 358. The body 356 has a stepped axial bore 362 formed therethrough having an outer portion 364 and an inner portion 366. The body 356 includes a downstream part 356' and an upstream part 356" threaded axially into an upstream end of the downstream part 356' and sealed to the downstream part 356' by an O-ring 355. The upstream part 356" terminates at its downstream end in an annular shoulder 357. Disposed in tile axial bore 362 are a seal 400, a valve core 374, and a spring 376.

The male fitting 354, like the male fitting 154 of the first embodiment, includes a body 380 having a bore 382 (FIG. 13f) formed therethrough. The body 380 presents 1) an inner end 384 which is mounted on the grommet 46 by the holder 70 and which is connected to the animal watering valve 58 and 2) a plug 386.

In this embodiment, the seal 400 performs the functions of both seals 168 and 170 of the embodiment discussed in Section 3 above and also exhibits additional beneficial characteristics. As best seen in FIG. 14, seal 400 is a combined seal which generally B-shaped when viewed in transverse cross section. It includes a first, upstream portion 402 and a second, downstream portion 404 separated by a divider portion 406 of reduced diameter when compared to the first and portions 402 and 404. Hence, the second portion 404 is located axially between the first portion 402 and the outlet end 360 of the body 356 of the female fitting 352. An upstream end portion 408 of the seal 400 includes an annular lip 410 which is located adjacent an inner radial edge of the seal 400 and which extends axially upstream from the remainder of the upstream end portion 408. The lip 410 provides generally linear contact between the seal 400 and the core 374, thereby forming a tighter seal. The shoulder 357 of the body 356 of the female fitting 352 engages the upstream end portion 408 of the seal 400 at a location radially outwardly of the lip 410, thereby clamping the seal 400 in the body 356.

The plug 386, the first and second seal portions 402 and 404, and the valve core 374 are so dimensioned and configured that, when the plug 386 is inserted axially into the bore 362 in the female fitting 352 from the outlet end thereof, the plug 386 assuredly seals against the seal before lifting the valve core 374 from its seat on the first portion 402 of the seal 400—even if the plug 386 is inserted into the bore 362 at an angle rather than axially. Hence, comparing FIGS. 13a–13c to one another, inserting the plug 386 axially into the bore 362 results in much the same operation described above, with the plug 386 sealing against at least the second portion 404 of the seal 400 before contacting the core 374, thereby preventing leaks. In fact, redundancy of sealing is preferably provided by dimensioning the plug 386, seal 400, and core 374 relative to one another such that, when the plug 386 is inserted axially into the bore 362, the plug 386 seals against both portions 402 and 404 of the seal 400 before lifting the core 374 from its seat. Due to the fact that the downstream portion 404 is formed integral with the upstream portion 402, the downstream portion 404 remains in place as the plug 386 engages and moves past it and maintains an effective seal with the plug 386. This is in contrast to a conventional O-ring such as the O-ring 168 of the previous embodiment, which may twist or roll as the plug moves past the O-ring in contact with it, thereby risking loss of seal or at least a less-effective seal.

If the plug 386 is inserted into the bore 362 at an angle α relative to the axial centerline of the bore 362 as seen in FIGS. 13d and 13e, the plug 386 still seals against at least one of the seal portions 402 and 404 before lifting the core 374 off its seat. The large, combined seal 400 also serves to help align the plug 386 with the axial centerline of the bore 362 so that the plug 386 is centered within the bore 362 before it reaches the overtravel position illustrated in FIG. 13f.

8. Construction and Operation of Passive Locking Quick-Connect Coupling

Figure 15C:
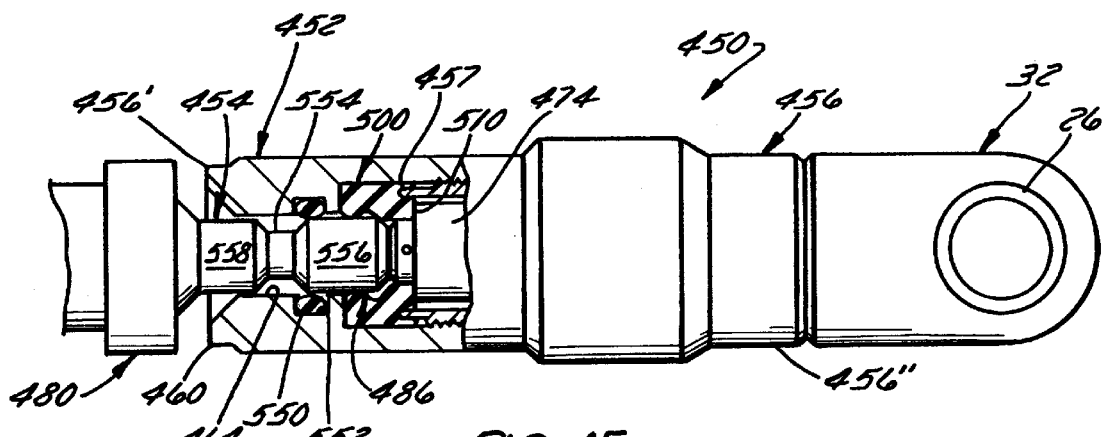
Figure 15D:
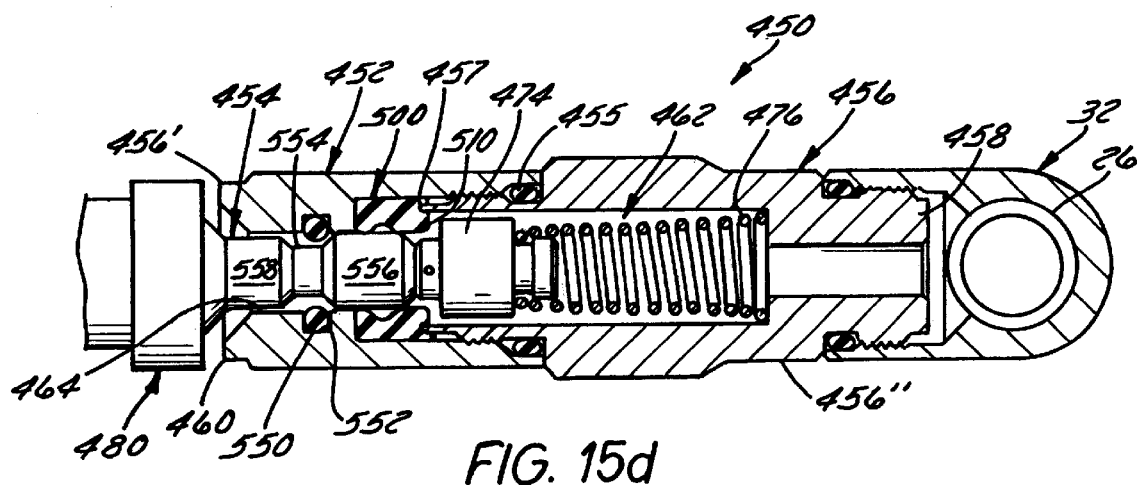
Figure 15E:
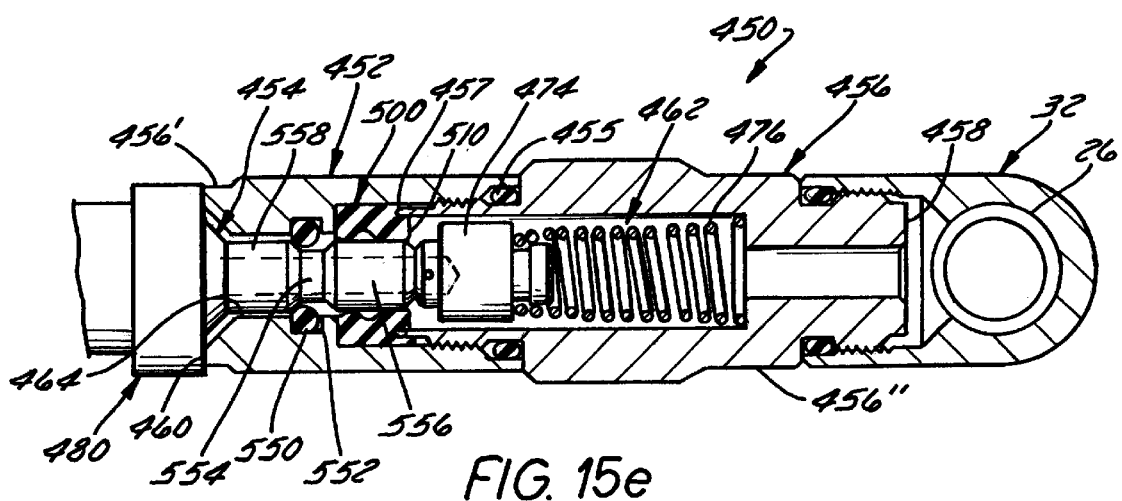

Referring now to FIGS. 15–15e, a passive quick-connect coupling 450 usable with the water docking system described in Sections 2–5 above or in other applications is, in many respects, similar to the friction-fit quick-connect coupling 350 described in Section 7 above except for the fact that it additionally incorporates a locking O-ring 550 to inhibit unintended separation of the male and female fittings of the coupling 450. Elements of the coupling 450 corresponding to those of the coupling 350 are denoted by the same reference numerals, incremented by 100. The coupling 450 therefore includes a female fitting 452 and male fitting 454. The female fitting 452, like the female fitting 352 of the coupling 350, includes a body 456 having 1) an upstream end 458 which is threadedly connectable to the nipple 32, 2) a downstream end 460, and 3) a stepped axial bore 462 formed therethrough. Also as in the previous embodiments, the bore 462 includes an outer portion 464 and an inner portion 466. The body 456 includes a downstream part 456' and an upstream part 456" threaded axially into an upstream end of the downstream part 456' and sealed to the downstream part 456' by an O-ring 455. The upstream part 456" terminates at its downstream end in an annular shoulder 458. Disposed in the axial bore 462 are a seal 400, a valve core 474, and a spring 476.

The male fitting 454, like the male fitting 154 of the first embodiment, includes a body 480 having a bore 482 formed therethrough. The body 480 presents 1) an inner end 484 which is connected to the animal watering valve 58 and 2) a plug 486.

The seal 500 of this embodiment, like the seal 400 of the previous embodiment, includes a first, upstream portion 502 and a second, downstream portion 504 separated by a divider portion 506 of reduced diameter when compared to the first portion and to the second portion. An upstream end portion 508 of the seal 500 includes an annular lip 510 which is located adjacent an inner radial edge of the seal 500 and which extends axially upstream from the remainder of the upstream end portion 508. As in the previous embodiment, the shoulder 457 of the body 456 of the female fitting 452 engages the upstream end portion 508 of the seal 500 at a location radially outwardly of the lip 510, thereby clamping the seal 500 in the body 456. The plug 486, the first and second seal portions 502 and 504, and the valve core 474 are so dimensioned and configured that, when the plug 486 is inserted axially into the bore 462 in the female fitting 452 from the outlet end thereof, the plug 486 assuredly seals against the seal 500 before lifting the valve core 474 from its seat on the lip 510 of the first portion 402 of the seal 500—even if the plug 486 is inserted into the bore 462 at an angle rather than axially.

As mentioned above, the locking O-ring 550 causes the coupling 450 to function as a locking quick-connect coupling to the extent that it imparts significant resistance to separation of the male fitting 454 from the female fitting 452. However, advantageously, and unlike traditional locking quick-connect couplings, the fittings 452 and 454 can be detached from one another, without manipulating a pin, collar, or other locking element, simply by applying a sufficient separation force to the fittings 452 and 454 to overcome the retention forces imposed by the O-ring 550.

The O-ring 550 comprises a conventional resilient O-ring made out an elastomeric material such as natural rubber. However, in order to achieve the desired snap-fit effect, it is oversized when compared to standard O-rings used in a comparably-sized coupling. For instance, the diameter of the illustrated locking O-ring 550 is about twice the diameter of the sealing O-ring 455.

The O-ring 550 may be mounted in either the female fitting 452 or the male fitting 454, so-long as it snaps into a complementary groove in the other fitting when the coupling 450 is assembled. In the illustrated embodiment, the O-ring 550 is mounted in a circumferential groove 552 formed in the outer portion 464 of the bore 462. A mating circumferential groove 554 is formed in the plug 486 at a location which aligns the groove 554 with the O-ring 550 when the plug 486 is inserted far enough into the bore 462 to unseat the valve core 474 from the seal 500. Hence, the groove 554 separates the plug 486 into an upstream portion 556 and a downstream portion 558.

In use, the fittings 452 and 454 are coupled to one another much as described in the previous embodiments, with the plug 486 of the male fitting 454 being inserted progressively into the bore 462 of the female fitting as seen in FIGS. 15*a*–15*e*. For instance, as in the embodiment described in Section 7, the plug 486 always seals against the seal 500 before lifting the core 474 from its seat as seen in FIG. 15*d*, even if the plug 486 is inserted into the bore 462 at an angle relative to the axial centerline of the bore 462. The O-ring 550 is compressed as the plug 486 moves past it as seen in FIGS. 15*b* and 15*c* and, therefore, provides noticeable resistance to plug insertion.

However, the O-ring 550 expands when the groove 554 aligns with it as seen in FIG. 15*d*, providing a noticeable snap-fit feeling to the user due to the sudden drop in resistance to plug motion. As best seen in FIG. 15*e*, the groove 554 extends axially a sufficient distance to permit the plug 486 travel to its overtravel position without unseating the O-ring 550 from the groove 554.

In order to disconnect the coupling 450, the male fitting 454 must be pulled away from the female fitting 452 with sufficient force to recompress the O-ring 550 to permit the O-ring 550 to ride between the upstream portion 556 of the plug 486 and the periphery of the bore 462. The resultant resistance to fitting separation is significantly higher than that provided by traditional friction-fit couplings and achieves a locking effect. However, this locking is passive rather than active because, unlike with conventional locking quick-disconnect couplings, no collar or other separate locking device need be manipulated to disconnect the male fitting 454 from the female fitting 452.

Many other changes could be made to the invention as described above without departing from the spirit thereof. The scope of these changes will become apparent from the appended claims.

We claim:

1. A quick-connect coupling comprising:
    (A) a female fitting, said female fitting including
        (1) a generally cylindrical body having inlet and outlet ends, said body having a bore formed therein which extends axially from said outlet end thereof towards said inlet end thereof,
        (2) first and second axially spaced seals located in said bore, said second seal being located axially between said first seal and said outlet end of said body, and
        (3) a valve core located in said bore between said first seal and said inlet end of said body, said valve core being capable of sealingly seating on said first seal; and
    (B) a male fitting which includes a generally cylindrical plug, said plug 1) being dimensioned to fit in said bore in said female fitting of said coupling, 2) having an outer radial periphery, and 3) having a bore formed axially therethrough, wherein
        said plug, said first and second seals, and said valve core are so dimensioned and configured that, when said plug is inserted axially into said bore in said female fitting from said outlet end thereof, 1) said outer radial periphery of said plug first slidably seals against said second seal, 2) said plug then lifts said valve core from said first seal, and 3) said outer radial periphery of said plug then slidably seals against said first seal.

2. A quick-connect coupling as defined in claim 1, wherein said bore in said body of said female fitting of said coupling is stepped so as to have an inner portion having a first diameter and an outer portion having a second diameter which is smaller than said first diameter, wherein said first seal and said valve core are located in said first portion of said bore and said second seal is located in said second portion of said bore.

3. A quick-connect coupling as defined in claim 1, wherein said coupling is a friction-fit quick-connect coupling and said male fitting of said coupling engages said female fitting with a friction fit only.

4. A quick-connect coupling as defined in claim 1, wherein said coupling is a locking quick-connect coupling, wherein said female fitting of said coupling includes 1) a collar slidably mounted on said body, and 2) a plurality of locking balls which are mounted in holes formed in said body, said locking balls engaging recesses in said outer radial periphery of said plug of said male fitting of said coupling when said plug is inserted into said bore in said female fitting, said collar being movable from a first position in which it forces said locking balls into said recesses to prevent axial movement of said male fitting with respect to said female fitting to a second position in which it permits said locking balls to move out of said recesses to permit axial movement of said male fitting with respect to said female fitting.

5. A quick-connect coupling for coupling a water manifold to an animal watering valve, said quick-connect coupling comprising:
    (A) a female fitting, said female fitting including
        (1) a generally cylindrical body having an inlet end coupled to said water manifold and having an outlet end, said body having a bore formed therein which extends axially through said body from said inlet end thereof to said outlet end thereof, said bore being stepped so as to have an inner portion having a first diameter and an outer portion having a second diameter which is smaller than said first diameter,
        (2) a first seal located in said outer portion of said bore,
        (3) a second seal located in said inner portion of said bore,
        (4) a valve core located in said inner portion of said bore between said first seal and said inlet end of said body, said valve core being capable of moving axially in said bore from a first position in which it is sealingly seated on said first seal to a second position in which it is spaced from said first seal,
        (5) a spring which biases said valve core toward said first position; and
    (B) a male fitting which includes a generally cylindrical plug, said plug
        (1) being dimensioned to fit in said bore in said female fitting of said coupling,
        (2) having an outer radial periphery, and
        (3) having a bore formed axially therethrough, wherein said plug, said first and second seals, and said valve core are so dimensioned and configured that, when said plug is inserted axially into said bore in said female fitting from said outlet end thereof, a) said outer radial periphery of said plug first slidably seals against said second seal, b) said plug then lifts said valve core from said first seal, and c) said outer radial periphery of said plug then slidably seals against said first seal.

6. A quick-connect coupling comprising:
    (A) a female fitting, said female fitting including
        (1) a generally cylindrical body having inlet and outlet ends, said body having a bore formed therein which extends axially from said outlet end thereof towards said inlet end thereof,
        (2) a combined seal located in said bore, said combined seal including first and second portions separated by a divider portion of reduced diameter when compared to said first portion and to said second portion, said second portion being located axially between said first portion and said outlet end of said body, and (3) a valve core located in said bore between said first seal portion and said inlet end of said body, said valve core being capable of sealingly seating on said first portion of said seal; and (B) a male fitting which includes a generally cylindrical plug, said plug 1) being dimensioned to fit in said bore in said female fitting of said coupling, 2) having an outer radial periphery, and 3) having a bore formed axially therethrough, wherein said plug, said first and second portions of said seal, and said valve core are so dimensioned and configured that, when said plug is inserted axially into said bore in said female fitting from said outlet end thereof, 1) said outer radial periphery of said plug first slidably seals against said second portion of said seal, 2) said outer radial periphery of said plug then slidably seals against said first portion of said seal, and 3) said plug then lifts said valve core from said first portion of said seal.

7. A quick-connect coupling as defined in claim 6, wherein said seal is generally B-shaped when viewed in cross-section.

8. A quick-connect coupling as defined in claim 6, wherein said plug, said first and second portions of said seal, and said valve core are so dimensioned and configured that, when said plug is inserted non-axially into said bore in said female fitting from said outlet end thereof, said outer radial periphery of said plug slidably seals against at least one of said first and said second portions of said seal before said plug lifts said valve core from said first portion of seal.

9. A quick-connect coupling as defined in claim 6, wherein an upstream end portion of said seal includes an annular lip which is located adjacent an inner radial edge of said seal and which extends axially upstream from the remainder of said upstream end portion of said seal, and wherein p1 said body of said female fitting includes a downstream part and an upstream part threaded axially into an upstream end portion of said downstream part, said upstream part terminating at its downstream end in an annular shoulder which engages said upstream end portion of said seal at a location radially outwardly of said lip, thereby clamping said seal in said body.

10. A quick-connect coupling as defined in claim 6, further comprising a locking resilient elastomeric O-ring mounted downstream of said combined seal on one of the inner peripheral surface of said body of said female fitting and the outer peripheral surface of said plug of said male fitting, wherein, when said plug of said male fitting is inserted far enough into said bore of said female fitting to lift said valve core from said seal, said locking O-ring is received in a groove formed in the other of said plug of said male fitting and said bore of said female fitting to inhibit separation of said male fitting and said female fitting.

11. A quick-connect coupling comprising:

(A) a female fitting, said female fitting including (1) a generally cylindrical body having inlet and outlet ends, said body having a bore formed therein which extends axially from said outlet end thereof towards said inlet end thereof, said body including a downstream part and an upstream part threaded axially into an upstream end portion of said downstream part, said upstream part terminating at its downstream end in an annular shoulder, an annular groove being formed in a radial periphery of a downstream end portion of said bore, (2) a combined seal located in said bore, said combined seal being generally B-shaped when viewed in cross section and including a first portion and a second portion separated by a divider portion of reduced diameter when compared to said first portion and to said second portion, said second portion being located axially between said first portion and said annular groove, an upstream end portion of said seal including an annular lip which is located adjacent an inner radial edge of said seal and which extends axially upstream from the remainder of said upstream end portion of said seal, said annular shoulder of said upstream part of said body engaging said upstream end portion of said seal at a location radially outwardly of said lip, thereby clamping said seal in said body, (3) a locking resilient elastomeric O-ring mounted in said annular groove, and (4) a valve core located in said bore between said first portion of said seal and said inlet end of said body, said valve core being capable of sealingly seating on said first portion of said seal;

(B) a male fitting which includes a generally cylindrical plug, said plug 1) being dimensioned to fit in said bore in said female fitting of said coupling, 2) having upstream and downstream axial ends, 3) having an outer radial periphery, 3) having an annular groove formed in said outer radial periphery at a location intermediate said upstream axial end and said downstream axial end, and 4) having a bore formed axially therethrough, wherein said plug, said first and second portions of said seal, and said valve core are so dimensioned and configured that, when said plug is inserted axially into said bore in said female fitting from said outlet end thereof, 1) said outer radial periphery of said plug first slidably seals against said second portion of said seal, 2) said outer radial periphery of said plug then slidably seals against said first portion of said seal, and 3) said plug then lifts said valve core from said first portion of said seal, wherein said plug, said first and second portions of said seal, and said valve core are so dimensioned and configured that, when said plug is inserted non-axially into said bore in said female fitting from said outlet end thereof, said outer radial periphery of said plug first slidably seals against at least one of said first and said second portions of said seal before said plug lifts said valve core from said first seal, and wherein when said male fitting is inserted into said female fitting sufficiently far to lift said valve core from said seal, said locking O-ring is received in said groove in said plug of said male fitting to inhibit separation of said male fitting and said female fitting.

* * * * *